United States Patent
Nishioka et al.

(10) Patent No.: US 8,033,714 B2
(45) Date of Patent: Oct. 11, 2011

(54) FLUID MIXING APPARATUS

(75) Inventors: Akira Nishioka, Hitachinaka (JP);
Kiyoshi Amou, Hitachinaka (JP);
Yoshihiro Sukegawa, Hitachi (JP);
Takehiko Kowatari, Kashiwa (JP);
Yasunaga Hamada, Hitachinaka (JP);
Ikuhisa Hamada, Kure (JP); Toshifumi Mukai, Kure (JP); Yoshinori Taguchi, Kure (JP); Hiroshi Yokota, Kashiwa (JP)

(73) Assignees: Hitachi High-Technologies Corporation, Tokyo (JP);
Babcock-Hitachi K.K., Tokyo (JP)

( * ) Notice: Subject to any disclaimer, the term of this patent is extended or adjusted under 35 U.S.C. 154(b) by 610 days.

(21) Appl. No.: 11/412,091

(22) Filed: Apr. 27, 2006

(65) Prior Publication Data
US 2006/0245296 A1 Nov. 2, 2006

(30) Foreign Application Priority Data

Apr. 28, 2005 (JP) ................................. 2005-131283
Nov. 18, 2005 (JP) ................................. 2005-334558

(51) Int. Cl.
*B01F 5/04* (2006.01)
*B01F 5/06* (2006.01)

(52) U.S. Cl. ............... 366/163.2; 366/174.1; 366/181.5; 366/337; 137/888; 137/896

(58) Field of Classification Search ................. 48/189.4; 366/181.5, 337, 338, 173.1, 174.1, 175.2, 366/181.8, 182.4, 182.2, 163.1, 167.1, 176.1, 366/163.2; 261/79.1; 137/888–896
See application file for complete search history.

(56) References Cited

U.S. PATENT DOCUMENTS

| | | | | | |
|---|---|---|---|---|---|
| 172,588 | A | * | 1/1876 | Seibel | 366/173.2 |
| 835,619 | A | * | 11/1906 | Issacs et al. | 366/165.4 |
| 1,113,041 | A | * | 10/1914 | Murphy | 48/189.4 |
| 1,218,250 | A | * | 3/1917 | Fox | 366/183.1 |
| 1,307,375 | A | * | 6/1919 | Pruden | 110/104 R |
| 1,370,920 | A | * | 3/1921 | Schmitt | 48/189.4 |
| 1,456,135 | A | * | 5/1923 | Lidholm et al. | 48/189.4 |

(Continued)

FOREIGN PATENT DOCUMENTS

DE 2 345 246 5/1974

(Continued)

OTHER PUBLICATIONS

English translation of DE 100 19 414 A1, USPTO, May 4, 2009.*

(Continued)

*Primary Examiner* — Charles E Cooley
(74) *Attorney, Agent, or Firm* — Crowell & Moring LLP

(57) ABSTRACT

A cylinder-shaped flow passage in which a first fluid flows includes an internal cylinder which is smaller in diameter than the flow passage. A swirl-generating stator having four vanes is radially fixed in the internal cylinder. A header space for supplying a second fluid is provided to the outer circumference of a wall surface of the internal cylinder in contact with flow separation areas which are formed along downstream surfaces of the swirl-generating stator as the first fluid runs into the swirl-generating stator. The wall surface of the internal cylinder is formed with openings through which the flow separation areas communicate with the header space. The second fluid supplied into the header space flows through the openings into the flow separation areas, and is diffused along the vanes of the swirl-generating stator to be swirled and mixed into the first fluid applied with swirling force by the swirl-generating stator.

5 Claims, 18 Drawing Sheets

1:FLUID 1
2:FLUID 2
3:FLUID MIXTURE
11:FLOW PASSAGE FOR FLUID 1 AND FLUID MIXTURE
12:FLOW PASSAGE FOR FLUID 2
13:INTERNAL CYLINDER
14:DIVIDER PLATE
15:SWIRL-GENERATING STATOR
16:OPENING

U.S. PATENT DOCUMENTS

| | | | | |
|---|---|---|---|---|
| 1,496,345 A * | 6/1924 | Lichtenthaeler | 366/165.2 |
| 1,500,103 A * | 7/1924 | Burdon et al. | 431/166 |
| 1,626,487 A * | 4/1927 | Warren | 366/163.2 |
| 1,636,187 A * | 7/1927 | Kessel | 261/89 |
| 1,657,891 A * | 1/1928 | Miller | 48/189.4 |
| 1,672,209 A * | 6/1928 | Goldberg | 123/67 |
| 1,678,225 A * | 7/1928 | Kincade | 366/338 |
| 1,679,177 A * | 7/1928 | Seymour | 48/189.4 |
| 1,752,506 A * | 4/1930 | Portail | 261/79.1 |
| 1,809,375 A * | 6/1931 | Chase | 48/189.2 |
| 1,855,275 A * | 4/1932 | Bailey | 48/189.4 |
| 1,880,533 A * | 10/1932 | Thomas | 165/154 |
| 1,921,282 A * | 8/1933 | Cook | 48/189.4 |
| 1,924,038 A * | 8/1933 | Herbsman et al. | 366/181.5 |
| 1,959,907 A * | 5/1934 | Ebert | 261/41.2 |
| 2,000,953 A * | 5/1935 | Hooker et al. | 366/339 |
| 2,029,210 A * | 1/1936 | Abate | 261/64.1 |
| 2,179,485 A * | 11/1939 | Avril | 366/181.2 |
| 2,240,104 A * | 4/1941 | Uhri, Jr. et al. | 48/189.4 |
| 2,460,884 A * | 2/1949 | Hjort et al. | 241/1 |
| 2,528,094 A * | 10/1950 | Walker | 366/165.2 |
| 2,669,437 A * | 2/1954 | Geeraert | 366/165.2 |
| 2,669,946 A * | 2/1954 | Peyton | 366/173.2 |
| 2,784,948 A * | 3/1957 | Pahl et al. | 366/174.1 |
| 2,831,754 A * | 4/1958 | Manka | 423/658.5 |
| 2,843,368 A * | 7/1958 | Schmidt | 261/79.1 |
| 3,190,618 A * | 6/1965 | Katzen | 366/337 |
| 3,297,305 A * | 1/1967 | Walden | 366/101 |
| 3,373,562 A * | 3/1968 | Wormser | 60/745 |
| 3,437,467 A * | 4/1969 | Jacobus | 48/189.3 |
| 3,530,844 A * | 9/1970 | Kawai | 123/546 |
| 3,697,051 A * | 10/1972 | Lachman et al. | 366/178.1 |
| 3,735,744 A * | 5/1973 | Brody et al. | 123/590 |
| 3,844,707 A | 10/1974 | Wormser | |
| 3,879,021 A * | 4/1975 | Riley | 366/137.1 |
| 4,015,574 A * | 4/1977 | Hanff | 123/590 |
| 4,026,817 A * | 5/1977 | Ciuti et al. | 516/53 |
| 4,068,830 A * | 1/1978 | Gray | 366/175.2 |
| 4,087,491 A * | 5/1978 | Chapin | 261/36.2 |
| 4,103,827 A * | 8/1978 | Kumazawa | 239/8 |
| 4,103,876 A * | 8/1978 | Hasselman et al. | 366/173.1 |
| 4,157,706 A * | 6/1979 | Gaskill | 126/595 |
| 4,159,881 A * | 7/1979 | Gogneau | 48/189.4 |
| 4,179,222 A * | 12/1979 | Strom et al. | 366/337 |
| 4,208,136 A * | 6/1980 | King | 366/338 |
| 4,211,277 A * | 7/1980 | Grosz-Roll et al. | 165/109.1 |
| 4,213,712 A * | 7/1980 | Aanonsen et al. | 366/168.2 |
| 4,270,576 A * | 6/1981 | Takeda et al. | 137/888 |
| 4,295,458 A * | 10/1981 | Pellerin | 48/189.4 |
| 4,344,752 A * | 8/1982 | Gallagher, Jr. | 431/354 |
| 4,408,892 A * | 10/1983 | Combes et al. | 366/337 |
| 4,416,610 A * | 11/1983 | Gallagher, Jr. | 431/4 |
| 4,441,823 A * | 4/1984 | Power | 366/167.1 |
| 4,448,540 A * | 5/1984 | McLeod | 366/160.1 |
| 4,469,446 A * | 9/1984 | Goodboy | 366/342 |
| 4,487,510 A * | 12/1984 | Buurman et al. | 366/337 |
| 4,498,786 A * | 2/1985 | Ruscheweyh | 366/336 |
| 4,564,504 A * | 1/1986 | Sorber | 422/189 |
| 4,623,521 A * | 11/1986 | Gravley et al. | 422/156 |
| 4,633,893 A * | 1/1987 | McConnell et al. | 134/95.1 |
| 4,674,888 A * | 6/1987 | Carlson | 366/337 |
| 4,718,393 A * | 1/1988 | Bakish | 123/593 |
| 4,753,535 A * | 6/1988 | King | 366/337 |
| 4,784,218 A * | 11/1988 | Holl | 165/109.1 |
| 4,813,788 A * | 3/1989 | Shih et al. | 366/337 |
| 4,824,614 A * | 4/1989 | Jones | 261/76 |
| 4,929,088 A * | 5/1990 | Smith | 366/337 |
| 5,145,256 A * | 9/1992 | Wiemers et al. | 366/336 |
| 5,427,181 A | 6/1995 | Laskaris et al. | |
| 5,429,308 A * | 7/1995 | Brown | 239/414 |
| 5,810,052 A * | 9/1998 | Kozyuk | 138/37 |
| 5,865,537 A * | 2/1999 | Streiff et al. | 366/174.1 |
| 6,027,241 A * | 2/2000 | King | 366/181.5 |
| 6,203,188 B1 * | 3/2001 | Maurer et al. | 366/338 |
| 6,276,823 B1 * | 8/2001 | King | 366/181.5 |
| 6,293,294 B1 * | 9/2001 | Loeb et al. | 137/1 |
| 6,736,376 B1 * | 5/2004 | DeLisle | 261/79.1 |
| 6,752,124 B1 * | 6/2004 | Chang | 123/306 |
| 6,767,007 B2 * | 7/2004 | Luman | 261/76 |
| 6,811,302 B2 * | 11/2004 | Fleischli et al. | 366/174.1 |
| 7,093,826 B2 * | 8/2006 | DeLisle | 261/78.1 |
| 7,111,829 B2 * | 9/2006 | DeLisle | 261/78.1 |
| 7,111,830 B2 * | 9/2006 | DeLisle | 261/79.1 |
| 7,220,048 B2 * | 5/2007 | Kohlgruber et al. | 366/147 |
| RE40,407 E * | 7/2008 | Natarius | 210/788 |
| 7,416,326 B2 * | 8/2008 | Sakata et al. | 366/163.2 |
| 7,416,404 B2 * | 8/2008 | Chan | 431/183 |
| 7,513,489 B2 * | 4/2009 | DeLisle | 261/78.1 |
| 7,547,002 B2 * | 6/2009 | Mao et al. | 261/78.1 |
| 2003/0072214 A1 * | 4/2003 | Fleischli et al. | 366/175.2 |
| 2003/0080037 A1 | 5/2003 | Mazzei | |
| 2004/0223408 A1 * | 11/2004 | Mathys et al. | 366/337 |
| 2005/0006797 A1 * | 1/2005 | DeLisle | 261/79.1 |
| 2005/0007872 A1 * | 1/2005 | Nagasawa et al. | 366/178.2 |
| 2005/0013756 A1 | 1/2005 | Amou et al. | |
| 2005/0230854 A1 * | 10/2005 | DeLisle | 261/79.1 |
| 2006/0245296 A1 * | 11/2006 | Nishioka et al. | 366/174.1 |
| 2007/0036694 A1 * | 2/2007 | Nishioka et al. | 422/168 |

FOREIGN PATENT DOCUMENTS

| | | |
|---|---|---|
| DE | 100 19 414 A1 | 10/2001 |
| EP | 77652 A1 * | 4/1983 |
| JP | 6-170197 A | 6/1994 |
| JP | 11-28337 A | 2/1999 |
| JP | 2002-174425 | 6/2002 |
| JP | 2007-144394 * | 6/2007 |

OTHER PUBLICATIONS

Yu, S.C.M., et al., Turbulent Mixing of Coaxial Nozzle Flows with a Central-Lobed Mixer, *Journal of Propulsion and Power*, Jul. 4-Aug. 1997, pp. 517-524, vol. 13, Singapore.

European Search Report dated Aug. 25, 2006 (Six (6) pages).

Japanese Office Action dated Dec. 7, 2010 (four (4) pages).

* cited by examiner

1: FLUID 1
2: FLUID 2
3: FLUID MIXTURE
11: FLOW PASSAGE FOR FLUID 1 AND FLUID MIXTURE
12: FLOW PASSAGE FOR FLUID 2
13: INTERNAL CYLINDER
14: DIVIDER PLATE
15: SWIRL-GENERATING STATOR
16: OPENING

FIG. 2A
FIG. 2B
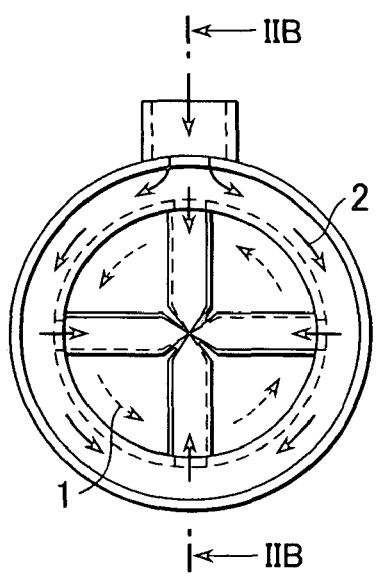
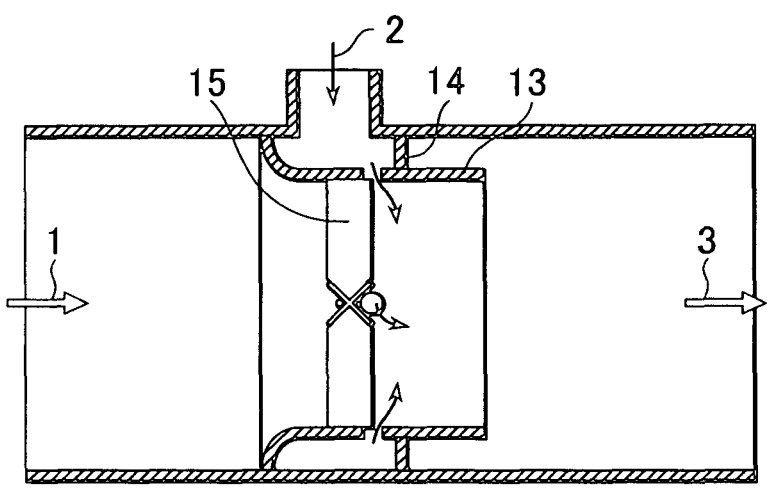

FIG. 18A
CONFIGURATION
FIG. 18B
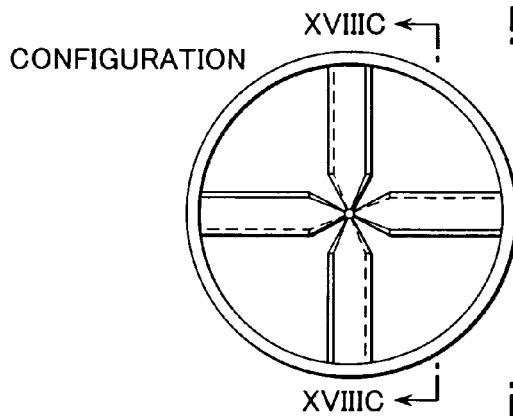
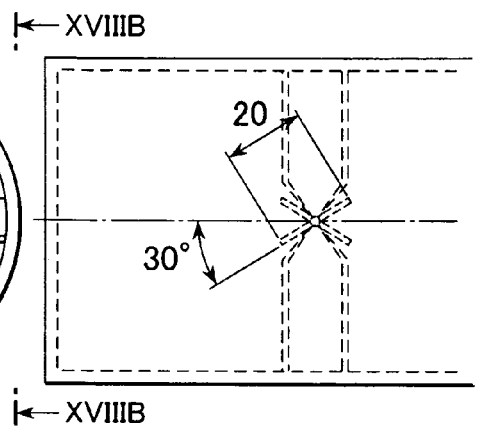
FIG. 18C
FLOW VELOCITY
1 m/s
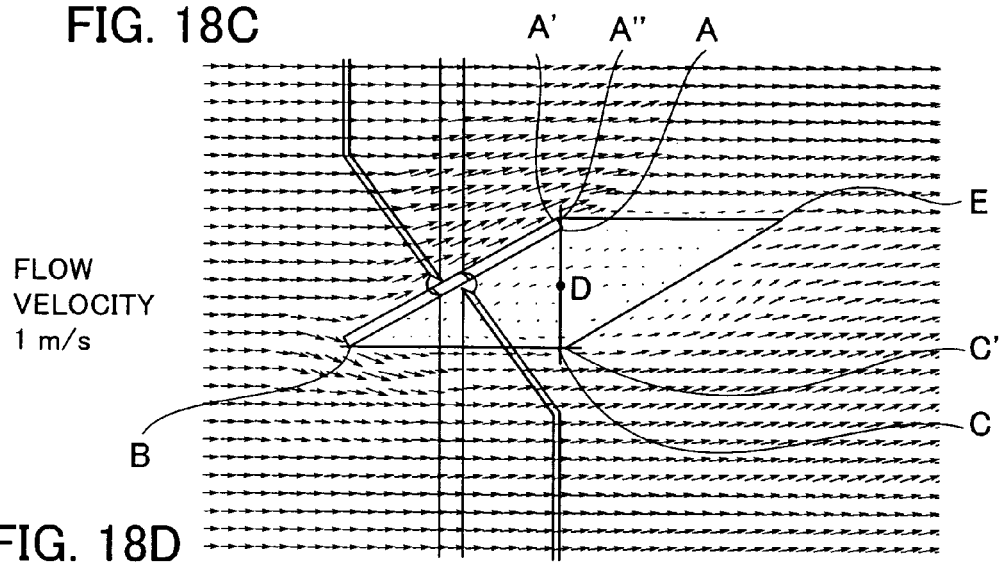
FIG. 18D
FLOW VELOCITY
10 m/s
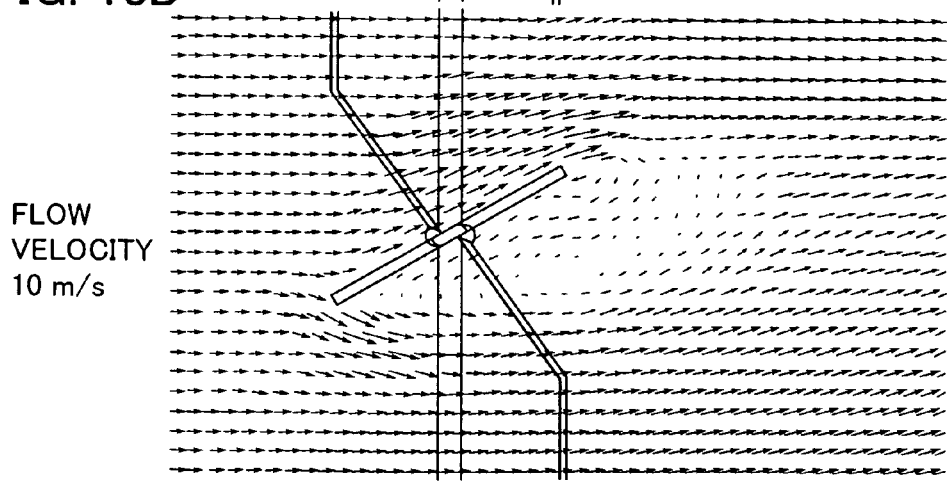

CONFIGURATION

FLOW VELOCITY 1 m/s

FLOW VELOCITY 10 m/s

CONFIGURATION

FLOW VELOCITY 1 m/s

FLOW VELOCITY 10 m/s

FIG. 21A
CONFIGURATION
FIG. 21B
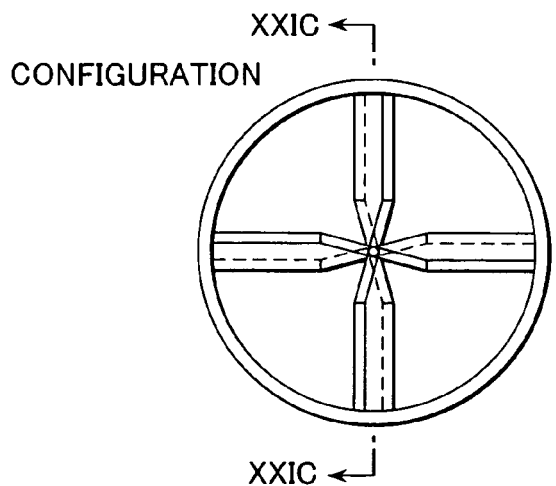
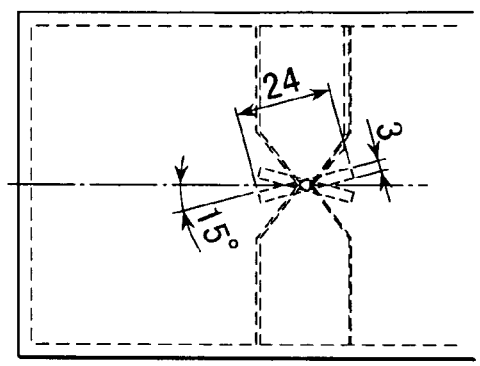
FIG. 21C
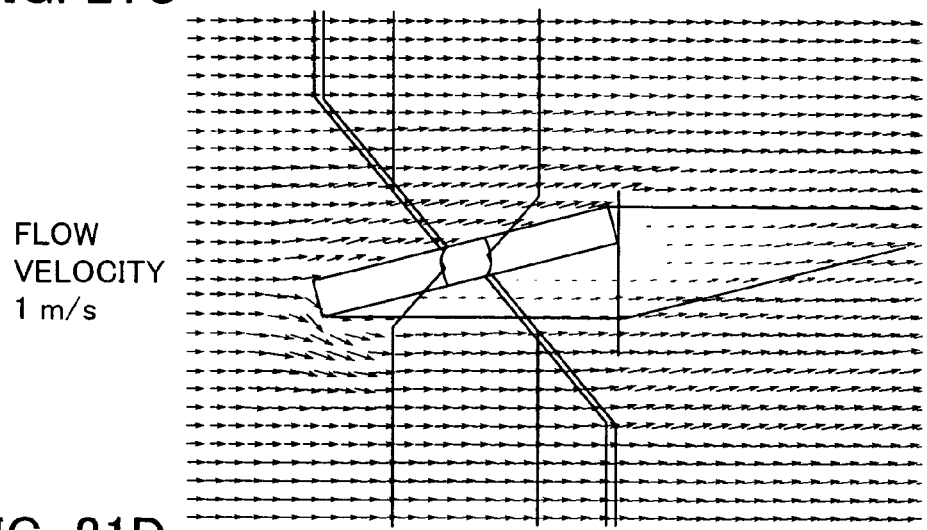
FLOW VELOCITY 1 m/s
FIG. 21D
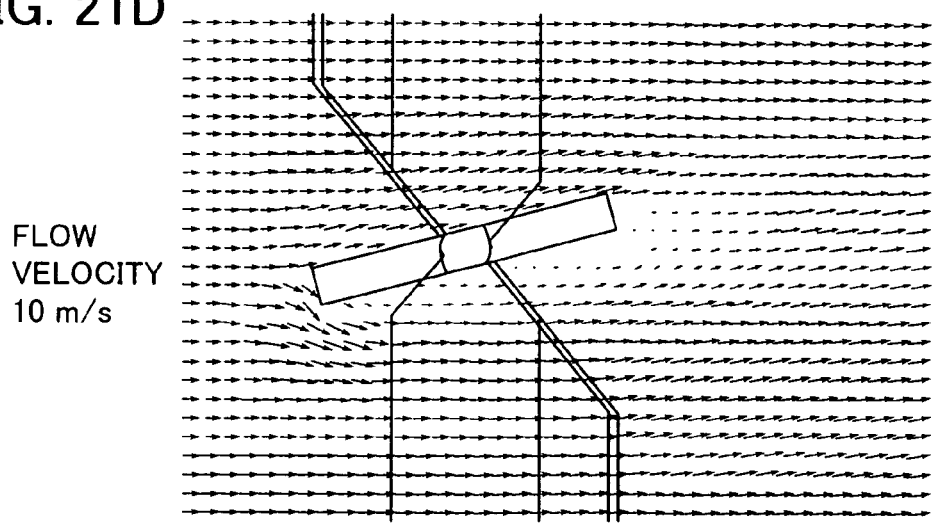
FLOW VELOCITY 10 m/s

CONFIGURATION

FLOW VELOCITY 1 m/s

FLOW VELOCITY 10 m/s

CONFIGURATION

FLOW VELOCITY 1 m/s

FLOW VELOCITY 10 m/s

CONFIGURATION

FLOW VELOCITY 1 m/s

FLOW VELOCITY 10 m/s

CONFIGURATION

FLOW VELOCITY 1 m/s

FLOW VELOCITY 10 m/s

FLUID MIXING APPARATUS

BACKGROUND OF THE INVENTION

1. Field of the Invention

The present invention relates to an apparatus for mixing two fluids, and more particularly to a fluid mixing apparatus for mixing two fluids while passing the two fluids therethrough.

2. Description of the Related Arts

In such devices as a NOx reduction device which reduces NOx contained in an exhaust gas in an internal combustion engine by dosing a reductive gas to the exhaust gas, an EGR device which controls the combustion characteristic of the internal combustion engine by mixing a recirculated exhaust gas into intake air of the internal combustion engine, and a combustor which mixes a gas-turbine fuel and air, a plurality of gases need to be mixed while they pass through the devices. In a diesel engine, for example, NOx is inevitably generated in a thermally efficient, high-temperature combustion. Thus, an aftertreatment is performed in which a reductant is dosed into the exhaust gas to decompose NOx through a reduction reaction. A method of reducing NOx in the exhaust gas by using ammonia, as a reductant, which is generated through a hydrolysis reaction of urea water dosed to the exhaust gas, is called urea-SCR (Selective Catalytic Reduction). The exhaust gas mixed with ammonia is passed through a denitration catalyst so that a denitration reaction (i.e., a reduction reaction of NOx) through ammonia is promoted even at a low temperature. In the denitration reaction of this case, 1 mol of NOx is reacted with 1 mol of ammonia to generate nitrogen and water. It is preferable to perform the mixing such that a molar ratio of NOx to ammonia is 1:1. If the ratio of ammonia is smaller than this ratio, a part of NOx fails to be decomposed due to the shortage of ammonia. As a result, a NOx reduction ratio is decreased. Conversely, if the ratio of ammonia is excessive, ammonia is not used for the denitration. As a result, an excessive portion of the urea water is wasted, and an extra treatment needs to be performed to prevent ammonia from being discharged outside.

Therefore, it is important in the urea-SCR to dose the urea water in appropriate proportion to NOx contained in the exhaust gas such that the ratio of the generated ammonia to NOx is 1:1, and to maintain this ratio even in a local density. That is, the mixing needs to be performed such that a generated ammonia gas is diffused in the exhaust gas at a uniform density.

As another technique of reducing NOx in the diesel engine, there is a technique called EGR (Exhaust Gas Recirculation). According to the EGR, a part of the exhaust gas is mixed with the intake air to increase a ratio of an inactive gas in combustion, and a combustion speed is reduced to suppress local elevation of a combustion temperature. Thereby, the amount of NOx to be generated is reduced. In the EGR, when the exhaust gas is mixed into the intake gas, it is required to suction the exhaust gas while making the pressure of the intake air at a negative value so that the exhaust gas flows toward the intake air even when the pressure of the exhaust gas is low, and to make a mixing ratio of the exhaust gas equal between cylinders so that the mixed exhaust gas has an even density.

As a technique of mixing plural types of gases while conveying the gases, a technique using a swirl flow is commonly known. JP, A 2002-174425 (page 3, FIG. 1) describes a technique of mixing air with a fuel in a gas turbine combustor by swirling the air with a swirl-generating stator and supplying the fuel through a fuel nozzle which has an opening at a downstream side of the swirl-generating stator.

SUMMARY OF THE INVENTION

In the above-described gas turbine combustor, the air is mixed with the fuel by the swirl flow generated by the swirl-generating stator. To mix the air and the fuel so that their mixture has an even density, the gas turbine combustor needs to have an open space of a certain dimension after the fuel has been supplied thereto. Therefore, a device for further promoting the mixing of the air and the fuel is required to downsize the fluid mixing apparatus.

Further, in a mixing apparatus for mixing the exhaust gas and the intake air for the EGR, as well as even mixing of the exhaust gas and the intake air in a small space, suction of the exhaust gas while suppressing the pressure loss of an intake air system as much as possible is required.

Similarly, a system according to the urea-SCR is also required to be capable of evenly mixing the ammonia gas and the exhaust gas in a small space, and suctioning only a necessary amount of the ammonia-containing dosed gas while suppressing the pressure loss of a flow passage system for the exhaust gas as much as possible.

It is an object of the present invention to evenly mix a first fluid and a second fluid in a small space in conveying and mixing the two fluids, by suctioning only a necessary amount of the second fluid while suppressing the pressure loss of the first fluid as much as possible.

The above object can be achieved by fixedly placing a swirl-generating stator including a plurality of vanes in a flow passage through which the first fluid passes, causing the swirl-generating stator to swirl the first fluid around a flow passage axis line, and supplying the second fluid in flow separation areas of the first fluid, which are formed along downstream surfaces of the swirl-generating stator when the first fluid is swirled.

That is, specifically, the above object can be achieved by a fluid mixing apparatus which mixes a first fluid and a second fluid while passing the two fluids therethrough, and which includes a flow passage, a swirl-generating stator, and a second fluid supplying device. The flow passage passes the first fluid therethrough. The swirl-generating stator includes a plurality of vanes and is fixedly and radially placed in the flow passage for flowing the passing first fluid in a direction of swirling around a flow passage axis line. The second fluid supplying device supplies the second fluid to flow separation areas of the first fluid formed along downstream surfaces of the swirl-generating stator when the first fluid passes through the swirl-generating stator.

The swirl-generating stator includes the plurality of vanes, and is radially placed around the flow passage axis line in the flow passage for the first fluid such that at least one of end peripheries of the swirl-generating stator in the radial direction is fixed to a wall surface of the flow passage. Each of the vanes has an angle of attack of a certain value with respect to a flow direction of the first fluid. With the vanes provided to rotate around the axis of the swirl-generating stator, the respective vanes bend flow lines of the first fluid. Thereby, a swirl flow is generated in which the first fluid as a whole spirally flows in the flow passage. Each of the vanes is formed by a plate material and has the angle of attack. Therefore, a surface of the vane at one side, i.e., an upstream surface of the vane receives the first fluid and changes the flow direction of the first fluid along the surface of the vane. In this case, if the flow velocity of the first fluid is equal to or higher than a certain value, and if the angle of attack of the vane exceeds a predetermined value, the first fluid cannot follow the surface of the vane, i.e., a surface opposite to the surface which receives the first fluid (i.e., a downstream surface), and thus flows are separated from the surface of the vane. In areas in which the separated flows are formed (i.e., flow separation areas), flows advancing in an opposite direction to a direction of a main flow are formed, and a large vortex is formed. As a result, the pressure becomes lower inside the flow separation areas than outside thereof. The flow separation areas are formed at the respective plurality of the radially provided vanes. Therefore, the second fluid is flowed into each of the flow separation areas formed at the respective vanes, and the first fluid and the second fluid can be merged and mixed with each other.

According to the above-described configuration, the main flow of the first fluid is separated from the surfaces of the vanes in the flow separation areas of the swirl-generating stator, and thus is stagnant. Therefore, the second fluid flowed into the flow separation areas advances in a direction in which the second fluid has been flowed, without being immediately swept away by the first fluid. Thereby, the second fluid spreads in the radial direction of the flow passage for the first fluid. As the second fluid is flowed in a direction of intersecting with the main flow of the first fluid, diffusion of the second fluid is promoted in a direction in which the second fluid intersects the first fluid. Further, the large vortex generated in the flow separation areas at the downstream side of the swirl-generating stator also promotes the mixing of the first fluid and the second fluid.

Locations through which the second fluid is flowed into the flow separation areas can be provided for the respective vanes, but only discretely. Therefore, the second fluid is not supplied to a region located in the middle of the locations through which the second fluid is flowed into the flow separation areas. However, as the swirl-generating stator causes the first fluid to form the swirl flow, the second fluid is also spirally flowed. Thus, the diffusion of the second fluid can be promoted in the circumferential direction. By causing all of the above-described effects to work at the same time, the mixing of the first fluid and the second fluid is synergistically promoted.

Further, the negative pressure generated in the flow separation areas of the swirl-generating stator can be used as driving force for suctioning the second fluid. Furthermore, the pressure can be recovered as the first fluid exits from the flow separation areas. Therefore, high suction force for suctioning the second fluid can be generated, while suppressing the pressure loss of the first fluid. In addition, the negative pressure generated in the flow separation areas is increased by increasing the angle of attack of each of the vanes with respect to the main flow of the first fluid, which generate the swirl flow. Therefore, the suction force for suctioning the second fluid can be further increased by increasing the angle of attack of each of the vanes.

There are two methods for causing the second fluid to flow into the flow passage for the first fluid, i.e., a method of causing the second fluid to flow from the outside of the flow passage for the first fluid toward the central axis of the flow passage, and a method of causing the second fluid to flow from the central axis side of the flow passage toward the outer circumferential side of the flow passage in the radial direction. In the case of causing the second fluid to flow from the outside of the flow passage for the first fluid toward the central axis of the flow passage, the second fluid supplying device may include a plurality of openings which are formed on the wall surface of the flow passage for the first fluid at positions in contact with the flow separation areas, and which form inlets for receiving the second fluid. The second fluid supplying device may further include a space which is formed outside the wall surface of the flow passage for the first fluid for distributing the second fluid to the plurality of openings so that the second fluid flows into the flow passage for the first fluid through the plurality of openings (hereinafter referred to as a header space). The header space for distributing the second fluid may be formed such that a part of a wall surface of the header space includes an outer surface of the wall surface of the flow passage for the first fluid. With this configuration, the difference in pressure or velocity of the second fluid can be reduced between vicinities of the plurality of openings. Thus, the second fluid is evenly distributed to the respective openings. This helps the first fluid and the second fluid to be evenly mixed and also helps to save space.

Meanwhile, in the case of causing the second fluid to flow from the center of the flow passage for the first fluid toward the outside of the flow passage, a flow passage for the second fluid may be placed in the center of the flow passage for the first fluid, and openings may be formed on the flow passage for the second fluid. In this case, the second fluid supplying device may include a tube-shaped second fluid flow passage which is placed in an axial direction along the flow passage axis line of the flow passage for the first fluid, and which is closely attached to ends of the swirl-generating stator at a side of the flow passage axis line. The second fluid supplying device may further include a plurality of openings formed on an outer wall of the second fluid flow passage at positions in contact with the flow separation areas formed along the downstream surfaces of the swirl-generating stator for causing the second fluid to flow into the flow passage for the first fluid. The second fluid flow passage also serves as a header space for distributing the second fluid to the plurality of openings. The plurality of openings for causing the second fluid to flow into the flow passage for the first fluid are arranged such that each of the plurality of openings has an equal positional relationship to the second fluid flowing in the second fluid flow passage. This helps the second fluid to be evenly distributed to the respective openings.

The fluid mixing apparatus may be configured such that a cross-sectional area of the flow passage for the first fluid is smaller at a position at which the swirl-generating stator is provided than at an upstream position thereof. With this configuration, a mean flow velocity of the first fluid is preferably increased to decrease the static pressure of the first fluid.

The suction force to suction the second fluid can be increased by decreasing the static pressure of the first fluid. In the process of mixing the second fluid into the first fluid, if the fluid mixing apparatus does not include a supplying device for actively supplying the second fluid, such as a blower, the flow volume of the second fluid may not reach a necessary value. In such a case, if the fluid mixing apparatus is designed such that the cross-sectional area of the flow passage is reduced at the position at which the swirl-generating stator is provided to decrease the static pressure, the suction force required for flowing the necessary flow volume of the second fluid can be generated. Further, if the static pressure is decreased due to the increase in the flow velocity caused by the reduction in the cross-sectional area of the flow passage, the pressure can be recovered to a certain degree by increasing the cross-sectional area of the flow passage at a position at which the second fluid has been suctioned and thus decreasing the flow velocity. In this case, therefore, a final pressure loss becomes smaller than in a case in which the second fluid is suctioned by the negative pressure generated by a pressure loss of a valve or the like. As a result, the energy loss can be suppressed.

In a fluid mixing apparatus, if the flow volume of the first fluid is increased, the flow volume of the second fluid is also desired to be increased in many cases. In a case in which the decrease in the static pressure of the first fluid is used as the driving force for causing the second fluid to flow into the first fluid, the driving force is preferably increased in accordance with the increase in the flow volume of the first fluid.

Further, the fluid mixing apparatus may include a plurality of the flow passages for the first fluid each including therein the swirl-generating stator. The plurality of the flow passages may be juxtaposed inside another flow passage which is larger in cross-section than the plurality of the flow passages, with axis lines of the plurality of the flow passages extending in parallel to an axis line of the another flow passage. With this configuration, after the first fluid and the second fluid have been merged together in each of the plurality of the flow passages, the obtained fluid mixtures can be merged together in the another flow passage having the larger cross-section.

With the above configuration, the diameter of each of the plurality of the flow passages can be reduced. In general, if the diameter of a flow passage is reduced, the length of the flow passage required for equally mixing fluids can be reduced. This is due to the nature of a mixing phenomenon in a flow, i.e., a fluid is diffused in a perpendicular direction to the direction of the main flow. Thus, if the distance by which the fluid moves in the perpendicular direction to reach the circumference of a flow passage is reduced, the distance by which the fluid moves in the direction of the main flow during the above movement of the fluid is also reduced. Therefore, if the flow passage for the first fluid is divided to reduce the diameter of each of the thus divided flow passages which mix fluids by means of the swirl-generating stators, the length of each of the flow passages required for mixing the fluids is reduced. As a result, the fluid mixing apparatus can be downsized.

The openings through which the second fluid flows into the first fluid are preferably formed on the wall surface of the flow passage in contact with the flow separation areas of the first fluid. According to the knowledge of the present inventors (later described), each of the flow separation areas may include the following region.

That is, a virtual plane perpendicular to a radial direction of one of the radially placed vanes may be defined by a coordinate in an axis line direction of the flow passage for the first fluid and a coordinate in a swirl direction perpendicular to the axis line direction. Then, when points A", C, and D respectively represent a coordinate of a vane cross-section of the vane located at a most downstream position in the axis line direction and also at a most downstream position in the swirl direction, a coordinate located at the same position as the point A" in the axis line direction and also at a most upstream position of the vane cross-section in the swirl direction, and the midpoint of a line segment A"C, the flow separation area of the vane may be a space which is sandwiched by a line segment representing a downstream surface of the vane cross-section and a line segment symmetrical, with respect to the point D, to a line segment representing an upstream surface of the vane cross-section, and which includes coordinates of the vane in the swirl direction.

According to the above aspects of the present invention, in conveying and mixing the first fluid and the second fluid, the first fluid and the second fluid can be evenly mixed in a small space by suctioning only the necessary amount of the second fluid while suppressing the pressure loss of the first fluid as much as possible.

BRIEF DESCRIPTION OF THE DRAWINGS

FIGS. 2A and 2B are a front view and a cross-sectional view of the first embodiment shown in FIG. 1, respectively.

FIGS. 18A to 18D are diagrams illustrating a first example of the flow separation area formed in a case in which flat plates are used to form the swirl-generating stator.

FIGS. 21A to 21D are diagrams illustrating a fourth example of the flow separation area formed in the case in which flat plates are used to form the swirl-generating stator.

DESCRIPTION OF THE PREFERRED EMBODIMENTS

With reference to the drawings, embodiments of the present invention will now be described. In the following description of the embodiments, fluids are mixed as a common example. Needless to say, however, the present invention in which the fluids are mixed by using flow separation areas can be equally applied to fluids in the liquid state, fluids in the gas state, fluids in the gas state including minute liquid particles, and so forth.

Figure 1:
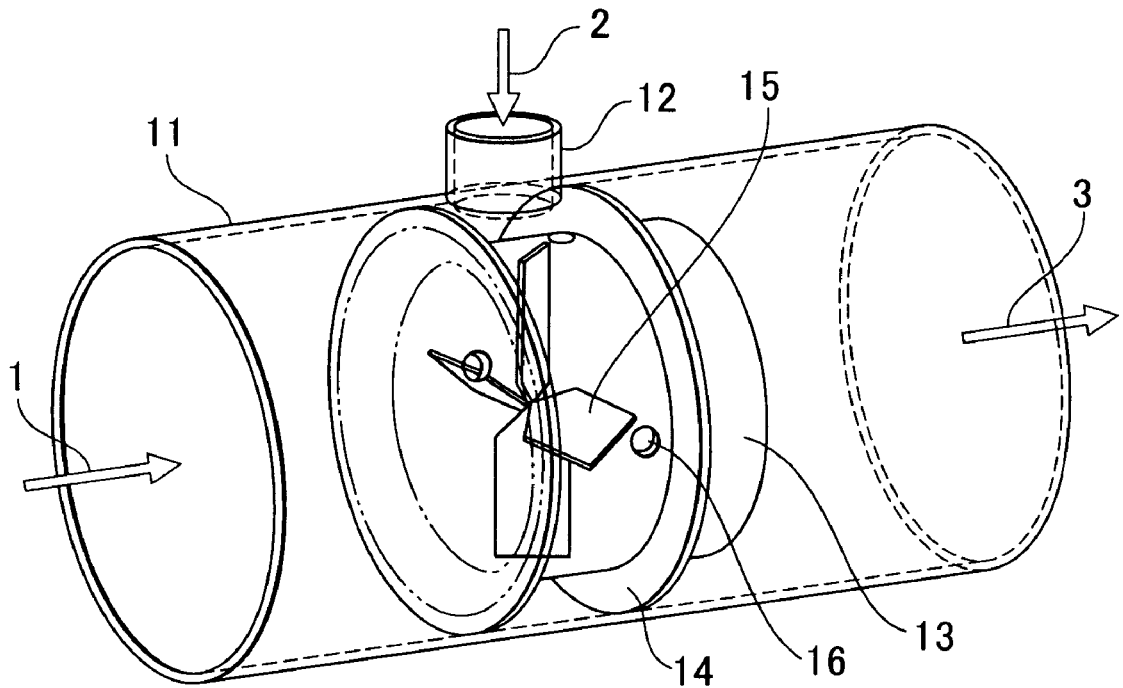
FIG. 1 is a perspective view of a first embodiment of a fluid mixing apparatus according to the present invention.

FIG. 1 is a perspective view of a fluid mixing apparatus according to a first embodiment of the present invention. FIG. 2A is a front view of the fluid mixing apparatus shown in FIG. 1, and FIG. 2B is a cross-sectional view of the fluid mixing apparatus cut along the IIB-IIB line shown in the front view of FIG. 2A. The fluid mixing apparatus shown in the drawings mixes a first fluid (hereinafter referred to as a fluid 1) and a second fluid (hereinafter referred to as a fluid 2) while passing the two fluids therethrough. The fluid mixing apparatus includes a flow passage 11, an internal cylinder 13, a divider plate 14, a flow passage 12, a swirl-generating stator 15, and openings 16. The flow passage 11 of a cylindrical shape has one end (at the left side in FIG. 1) from which the fluid 1 flows in. The internal cylinder 13 is formed into a cylindrical shape, and has an outside diameter smaller than an inside diameter of the flow passage 11. One end of the internal cylinder 13 is flared out in a trumpet shape such that a diameter of the end is increased to match the inside diameter of the flow passage 11. Further, the internal cylinder 13 is concentrically fixed inside the flow passage 11 such that the increased-diameter end portion of the internal cylinder 13 is directed to the upstream side. The divider plate 14 of a ring shape is attached between the outer circumferential surface of the internal cylinder 13 and the inner circumferential surface of the flow passage 11 for dividing a space between the two surfaces into an upstream-side section and a downstream-side section. The flow passage 12 is a duct connected to the flow passage 11 for supplying therein the fluid 2, and has an opening formed on a wall surface of the flow passage 11 between the divider plate 14 and the increased-diameter end portion of the internal cylinder 13. The swirl-generating stator 15 is fixedly attached in the internal cylinder 13. The openings 16 are formed on a wall surface of the internal cylinder 13 discretely at four locations in the circumferential direction upstream of the divider plate 14. Thus, the inside and the outside of the wall surface of the internal cylinder 13 communicate with each other through the openings 16. An outer circumferential periphery of the increased-diameter end portion of the internal cylinder 13 is fixedly attached in close contact with the inner circumferential surface of the flow passage 11.

Through the opening formed on the wall surface of the flow passage 11, the flow passage 12 communicates with a toric header space which is outside the outer circumference of the internal cylinder 13 and is divided by the divider plate 14 and the increased-diameter portion of the internal cylinder 13. The header space communicates with the flow passage for the fluid 1 extending inside the internal cylinder 13, through the four openings 16 formed on the wall surface of the internal cylinder 13. The flow passage 12, the opening formed on the wall surface of the flow passage 11, and the header space form a second fluid supplying device which supplies the second fluid to flow separation areas (later described).

The internal cylinder 13, the divider plate 14, and the fixed swirl-generating stator 15 form a mixing unit. A fluid mixture 3 formed in the mixing unit flows out of an exit side (the right side in FIG. 1).

The fluid 1 flowed in the flow passage 11 suctions the fluid 2, which has flowed in the header space from the flow passage 12, through the openings 16 by using negative pressure generated in the mixing unit. Thus, the fluid 1 is mixed with the fluid 2, and the fluid mixture 3 is formed and flows toward the downstream side. The openings 16 are formed on the wall surface of the internal cylinder 13 at positions in contact with the flow separation areas formed along downstream surfaces of vanes forming the swirl-generating stator 15. Through the openings 16, the fluid 2 flows into the inside of the internal cylinder 13 to merge into the fluid 1.

As illustrated in the front view of FIG. 2A, the swirl-generating stator 15 includes the four vanes which are arranged crosswise and radially extend around the central axis of the internal cylinder 13. The vanes are connected with one another at the central axis side thereof, and end peripheries of the vanes at the outer circumferential side in the radial direction are fixed to the inner circumferential surface of the internal cylinder 13.

In the present embodiment described below, the swirl-generating stator includes the four vanes. However, the number of the vanes is not limited, but may be at least two. The four vanes used in the present embodiment can be integrally manufactured by cutting a sheet of a metal plate into a predetermined shape and then twisting the metal plate in accordance with a tilt angle of each of the vanes.

As illustrated in FIG. 1, each of the vanes forming the swirl-generating stator 15 is arranged to be tilted with respect to a flow direction of the fluid 1, i.e., an axial line direction of the internal cylinder 13 such that each of the vanes has an angle of attack of a certain value. As illustrated in the front view of FIG. 2A, among the four vanes arranged crosswise, the vane at the upper position, the vane at the left position, the vane at the lower position, and the vane at the right position are tilted to have functions to bend the flow of the fluid 1 leftwards, downwards, rightwards, and upwards, respectively. These functions work in the same rotation direction around the central axis of the internal cylinder 13. Therefore, the fluid 1 flowed into the internal cylinder 13 is swirled by the fixed swirl-generating stator 15, as indicated by arrows representing the fluid 1 in the front view of FIG. 2A. In the present embodiment, the functions of the respective vanes to bend the flow equally work counterclockwise in the figure. Thus, the fluid 1 spirally flows in a left-hand screw direction. Even if the tilt direction of all of the vanes is reversed to swirl the fluid 1 clockwise, obtained functions are essentially the same. Therefore, similar mixing performance can be obtained.

As the fluid 1 runs into the swirl-generating stator 15, the fluid 1 is caused to flow in a direction of swirling around the axis line of the internal cylinder 13. In this process, the flow separation areas are formed along the downstream surfaces of the respective vanes forming the swirl-generating stator 15. Each of the flow separation areas is generated at a corresponding one of the vanes. Thus, the openings 16 provided for the flow separation areas are formed for the respective vanes.

Therefore, as illustrated in the front view of FIG. 2A, the fluid 2 flows into the inside of the internal cylinder 13 through four locations. In this process, the toric space formed between the outer circumferential surface of the internal cylinder 13 and the flow passage 12 serves as the header space for distributing the fluid 2. The toric space is designed to evenly distribute the fluid 2 to the openings 16 formed at the four locations. Specifically, a flow passage cross-sectional area is sufficiently set so as not to excessively increase the flow velocity of the fluid 2 in the header space, i.e., the flow velocity of the fluid 2 in the circumferential direction. Further, the opening area of each of the openings 16 is reduced to increase the pressure loss caused by fluid ejection so that the effect of a factor causing uneven distribution of the fluid 2 can be relatively reduced. This contributes to the distribution of the fluid 2 to the respective openings 16 by equal amounts. In this configuration, however, the pressure loss is increased to cause the fluid 2 to flow in. Thus, this configuration should be appropriately used in accordance with priorities of an individual system.

As illustrated in the cross-sectional view of FIG. 2B, the outer circumferential periphery of the increased-diameter end portion of the internal cylinder 13 is joined to the inner circumferential surface of the flow passage 11. Thus, the flow passage cross-sectional area of the internal cylinder 13 is smaller than the flow passage cross-sectional areas of the flow passage 11 at the upstream side and the downstream side of the internal cylinder 13, respectively. Therefore, as the fluid 1 flows into the internal cylinder 13 from the flow passage 11, the flow passage cross-sectional area is decreased. As a result, the flow velocity increases in the internal cylinder 13. The increase in the flow velocity in the static state is caused by conversion of the pressure energy into the velocity energy. Therefore, the increase of the flow velocity leads to the decrease of the static pressure. The fluid 2 is suctioned by negative pressure obtained by the decrease of the static pressure and the negative pressure generated by the flow separation occurring at the vanes. Then, the fluid 2 flows from the header space through the openings 16 into the space in which the fluid 1 flows, i.e., the inside of the internal cylinder 13.

Figure 3A:
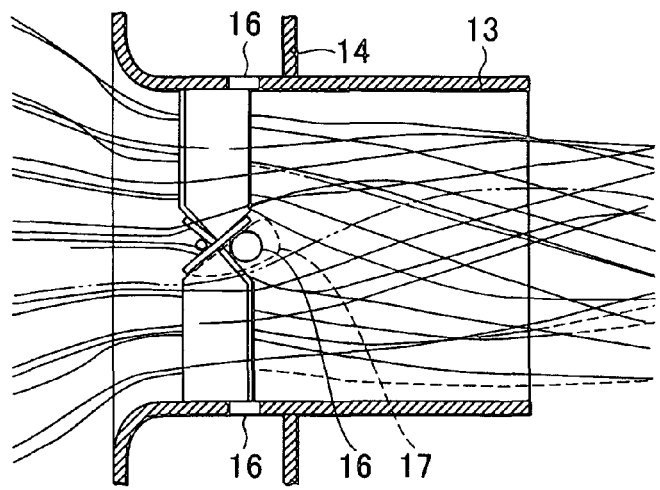
FIG. 3A is a cross-sectional view of the fluid mixing apparatus shown in FIG. 1, illustrating flow lines of the first fluid near the swirl-generating stator.
Figure 3B:
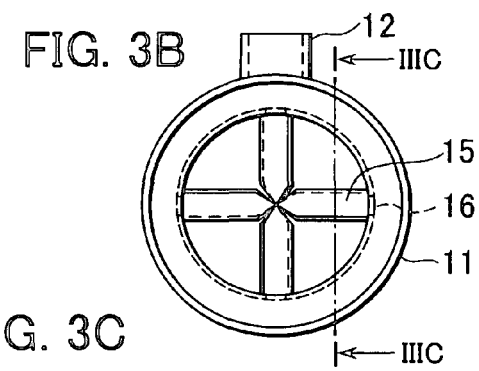
FIG. 3B is a front view of the fluid mixing apparatus shown in FIG. 1.
Figure 3C:
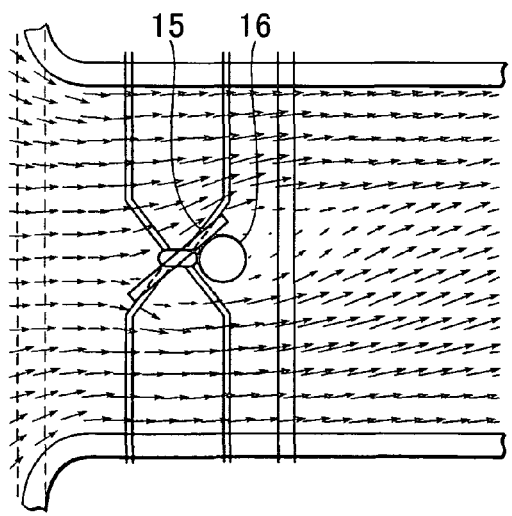
FIG. 3C is a cross-sectional view of the fluid mixing apparatus shown in FIG. 1, illustrating velocity vectors at a cross-section of the fluid mixing apparatus.
Figure 3D:
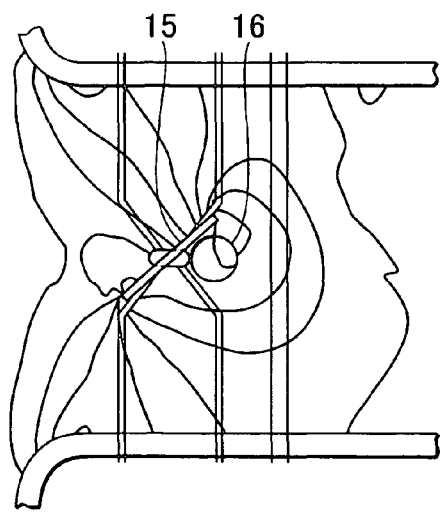
FIG. 3D is a cross-sectional view of the fluid mixing apparatus shown in FIG. 1, illustrating isobaric lines at the cross-section of the fluid mixing apparatus.

FIGS. 3A to 3D illustrate flow lines, velocity vectors, and pressure distribution of a fluid in the internal cylinder 13. FIG. 3A illustrates the flow lines of the fluid 1. FIG. 3B shows a position of a cross-section of the present embodiment. FIG. 3C illustrates coplanar velocity vectors of the fluid 1 in the cross-section cut along the IIIC-IIIC line shown in FIG. 3B. FIG. 3D illustrates, in isobaric lines, the distribution of the static pressure in the cross-section cut along the IIIC-IIIC line shown in FIG. 3B. The above flow lines, velocity vectors, and pressure distribution are results of a flow analysis through a numeric calculation, particularly of extracted flows of the fluid 1 around the swirl-generating stator 15. The flow direction of the fluid 1 in the cross-sectional views of FIGS. 3A, 3C, and 3D is the same as the flow direction shown in the cross-sectional view of FIG. 2B.

In the diagram illustrating the flow lines (hereinafter referred to as a flow line diagram), the flow lines at the upstream side of the internal cylinder 13 indicate contracted flows. The vane at the front side in the drawing bends the flows upwards, while the vane at the back side in the drawing bends the flows downwards. Thus, the flow lines at the front side intersect with the flow lines at the back side, as they are viewed at the same time. When the flow lines are observed with this understanding in mind, it is understood that the flows of the fluid 1 are swirled as the fluid 1 passes through the swirl-generating stator 15.

The vanes and the openings 16 are axisymmetrically arranged. Therefore, the following description will be made focusing on the vane located in the center of the internal cylinder 13 and at the front side in the cross-sectional views of FIGS. 3A, 3C, and 3D. An upper-left facing surface of the vane formed by a flat plate receives the inflowing flows. In the flow line diagram, therefore, the distance between each of the flow lines and the vane is smaller at a lower edge than at an upper edge of the vane. Meanwhile, at a rear surface of the upper-left facing surface (i.e., a downstream surface), the flows are not bent exactly to the angle of the vane. Therefore, the distance between each of the flow lines and the vane is larger at a trailing edge than at a leading edge of the vane. As observed from this case, the flow lines need to be bent when the flows advance along a solid surface. In reality, however, the flow lines are not bent exactly to the angle of the vane and thus are separated from the solid surface. This phenomenon is called a flow separation. The flow separation can be observed more clearly in the diagram illustrating the velocity vectors (hereinafter referred to as a velocity vector diagram).

In the velocity vector diagram, among velocity vectors of the fluid 1 located around the cross-section cut along the IIIC-IIIC line shown in FIG. 3B, only those velocity vectors near the cross-section are extracted and shown. The size and the direction of each arrow indicate the velocity amplitude and the direction of each of the flows, respectively. In the flow separation areas, flows are separated from the vanes. In the flow separation areas, therefore, the velocity of the flows is substantially decreased, and the direction of the flows is different from the direction of the main flow. As a result, one vortex is formed in the flow separation areas as a whole. This vortex can be also expected from the isobaric lines.

In the diagram illustrating the static pressure distribution in the isobaric lines (hereinafter referred to as a pressure distribution diagram), the static pressure as a whole decreases gradually from the upstream to the downstream. A contrary phenomenon is locally observed at an upstream surface of the leading edge of the vane and in the flow separation area. As the flows run into the upstream surface of the leading edge of the vane, the dynamic pressure is converted into the static pressure, and the static pressure is increased. The lowest point of the static pressure can be observed at the downstream surface of the vane. The minimum point of the pressure indicates that a vortex is formed around the minimum point. It is therefore understood that the flow separation generates the vortex and thus the minimum point of the pressure. Therefore, the pressure in the flow separation areas becomes negative.

The flow separation occurs when a fluid fails to bend exactly to the angle of a solid surface due to the inertial force of the fluid. Therefore, as the inertial force is increased, the flow separation occurs more frequently. The occurrence of the flow separation relates to the angle of the vane with respect to the inflowing fluid 1, also to such factors as the flow velocity and the viscosity of the fluid 1. In general, a ratio between the inertial force and the viscous force of a fluid, which is called the Reynolds number, is used as an index showing occurrence or non-occurrence of the flow separation and the change in size of the flow separation area. In the flow line diagram, an approximate range of the flow separation area in the present embodiment is indicated by a broken line 17.

It is most preferable to form each of the openings 16 in an area on the wall surface of the internal cylinder 13 corresponding to the interior of the flow separation area 17. However, even if the opening 16 penetrates into the outside of the flow separation area 17 for manufacturing convenience or for another reason, there is no problem as long as the opening 16 includes the area on the wall surface of the internal cylinder 13 corresponding to the flow separation area 17. The opening 16 can be easily formed into a circular hole. Alternatively, to form the opening 16 in the area on the wall surface of the internal cylinder 13 corresponding to the flow separation area 17 and to obtain as large the opening area as possible, the opening 16 may be effectively formed into a shape along the broken line 17. The above-described relationship of the vane to the opening 16 applies to each one of the four vanes.

The inlet for causing the fluid 2 to flow into the internal cylinder 13 is thus formed in the area on the wall surface of the internal cylinder 13 corresponding to the flow separation area 17. Thus, the fluid 2 is prevented from being immediately swept away by the fluid 1 after having flowed into the inside of the internal cylinder 13. As a result, the fluid 2 can be easily diffused into the central region of the internal cylinder 13. If the inlet for causing the fluid 2 to flow into the internal cylinder 13 is not formed in the area on the wall surface of the internal cylinder 13 corresponding to the flow separation area 17, it becomes difficult for the fluid 2 to advance across the flows of the fluid 1 to reach the vicinity of the center of the internal cylinder 13. As a result, the fluid 2 flows at the outer circumferential side of the internal cylinder 13. In this case, the fluid 2 reaches the vicinity of the center of the internal cylinder 13 through the convective diffusion and the molecular diffusion. Therefore, it takes time for the fluid 2 to reaches the vicinity of the center of the internal cylinder 13. To evenly mix the fluid 1 and the fluid 2, the size of the fluid mixing apparatus is increased.

After the fluid 2 has been diffused in the radial direction of the internal cylinder 13 through the flow separation areas, the fluid 2 flows along the swirl flow of the fluid 1 to be diffused in the circumferential direction. In this way, as the flow separation and the swirl flow are utilized at the same time, the fluid 2 is diffused two-dimensionally with respect to the flow passage cross-section. Accordingly, the mixing of the fluid 1 and the fluid 2 is promoted in a small space so that the fluid mixture has an even density distribution.

As described above, according to the present embodiment, when the first fluid and the second fluid are conveyed and mixed, the first fluid and the second fluid can be evenly mixed in a small space by suctioning only a necessary amount of the second fluid while suppressing the pressure loss of the first fluid as much as possible.

Second Embodiment

Figure 4:
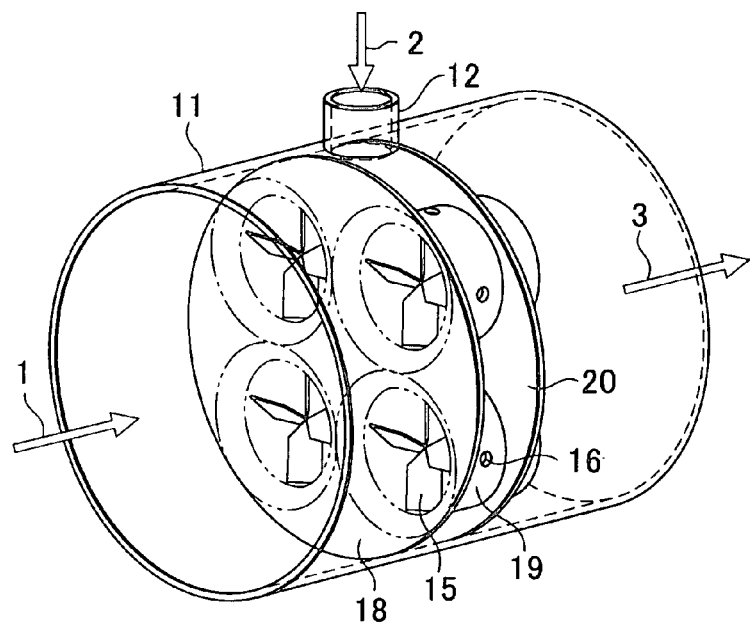
FIG. 4 is a perspective view of a second embodiment of the fluid mixing apparatus according to the present invention.
Figure 5A:
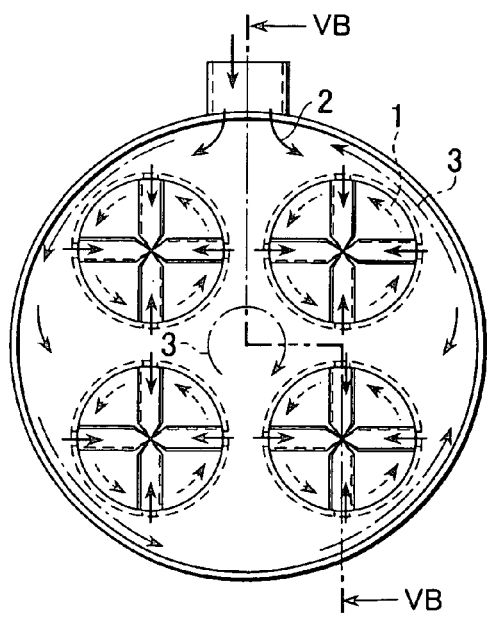
FIGS. 5A and 5B are a front view and a cross-sectional view of the second embodiment shown in FIG. 4, respectively.
Figure 5B:
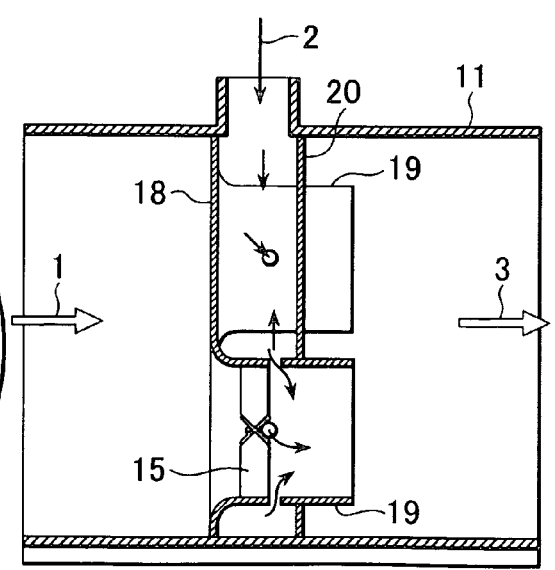

FIG. 4 is a perspective view of a fluid mixing apparatus according to a second embodiment of the present invention. FIG. 5A is a front view of the fluid mixing apparatus. FIG. 5B is a cross-sectional view of the fluid mixing apparatus cut along the VB-VB line shown in FIG. 5A. The components and objects of the present embodiment having the similar functions as the components and objects of the first embodiment are indicated by the same reference numerals, and description thereof will be omitted.

The second embodiment is different from the first embodiment in that the interior of the flow passage 11 is divided by a flat plate 18 and a divider plate 20, which are perpendicular to the axis line of the flow passage 11, and that four internal cylinders 19 are connected to the flat plate 18 and the divider plate 20. The flat plate 18 divides the flow passage 11 at an upstream position of a connecting position of the flow passage 12, and has four openings. The divider plate 20 divides the flow passage 11 at a downstream position of the connecting position of the flow passage 12, and similarly has four openings. The four openings of the flat plate 18 are equal in size and arranged equally and discretely in the circumferential direction. An increased-diameter end portion of an upstream side opening of each of the internal cylinders 19 is fit in and fixedly connected to the corresponding one of the four openings of the flat plate 18. Further, the outer circumference of a cylinder portion of each of the internal cylinders 19 is fit into the corresponding one of the openings of the divider plate 20. Thus, the center of one of the openings of the flat plate 18, the axis line of the corresponding one of the four internal cylinders 19, and the center of the corresponding one of the openings of the divider plate 20 form the same straight line. Further, the axis lines of the internal cylinders 19 extend parallel to the axis line of the flow passage 11. That is, the plurality of the internal cylinders 19, which form the flow passages for the fluid 1, are provided inside the flow passage 11 having a larger diameter than the diameters of the internal cylinders 19 such that the axis lines of the internal cylinders 19 and the axis line of the flow passage 11 extend parallel to each other.

As in the case of the internal cylinder 13 described above, each of the four internal cylinders 19 includes therein the swirl-generating stator 15 and is formed with the openings 16. The fluid 1 flowed into the flow passage 11 is divided to flow into the four internal cylinders 19. The thus divided four flows of the fluid 1 run parallel to one another. In the following description of the present embodiment, the four internal cylinders 19 are prepared, as one example. However, the number of the internal cylinders 19 is not limited, and may be any other number. The fluid 2 flows from the flow passage 12 into the header space, i.e., a space sandwiched between the flat plate 18 and the divider plate 20. Then, the fluid 2 flows into each of the four internal cylinders 19 through the plurality of openings 16 formed on the internal cylinder 19, and is mixed with the fluid 1. As a fluid mixture formed in the internal cylinder 19 flows out of the internal cylinder 19, the fluid mixture is released into a large space in the flow passage 11. Then, the fluid mixture merges into other fluid mixtures which have been formed and flowed in parallel in the other internal cylinders 19. The thus merged fluid mixtures flow out in the form of the fluid mixture 3 in which the fluids have been further mixed together.

The swirl-generating stators 15 provided to the respective internal cylinders 19 and the openings 16 of the present embodiment are similar to the swirl-generating stators 15 and the openings 16 of the first embodiment. Each of the four swirl-generating stators 15 swirls the fluid 1 in the left-hand screw direction. In the case in which each of the swirl-generating stators 15 include four vanes, the four openings 16 are formed on each of the internal cylinders 19. Thus, the sixteen openings 16 in total are formed for all of the four internal cylinders 19. To evenly distribute the fluid 2 to the sixteen openings 16, the space sandwiched by the flat plate 18 and the divider plate 20 serves as the header space. Accordingly, as illustrated in the front view of FIG. 5A, the fluid 2 are divided into separate flows.

The cross-sectional view of FIG. 5B illustrates a cross-sectional view of one of the internal cylinders 19 located at the lower position, and an external view of one of the internal cylinders 19 located at the upper position. The internal cylinder 19, as viewed from outside, is formed with holes at four locations through which the fluid 2 is suctioned into the internal cylinder 19. When the fluid 2 enters inside the internal cylinder 19, the fluid 2 reaches the flow separation areas formed by the swirl-generating stator 15. Thus, the fluid 2 can reach the vicinity of the center of the internal cylinder 19, and also can be swirled and mixed with the fluid 1.

The fluid mixture flowing out of the internal cylinder 19 is released into the space in the flow passage 11. In this process, the swirl flow formed in the internal cylinder 19 stays for a while. In the front view of FIG. 5A, in each of the four internal cylinders 19, the swirl is formed in the counterclockwise direction. Then, the flows coming out of the respective internal cylinders 19 merge and interfere with one another. The swirls are formed inside the respective internal cylinders 19 at positions close to the tube wall of the flow passage 11, i.e., the outside regions as viewed from the flows flowed out into the flow passage 11. If the directions of these swirls formed in the outside regions are sequentially connected to one another, one large swirl flowing in the counterclockwise direction is formed. Among dashed arrows indicating swirl directions of the fluid mixture 3 shown in the front view of FIG. 5A, the dashed arrows appearing near the wall of the flow passage 11 indicate the swirl direction of the above large swirl. That is, having flowed out of the respective internal cylinders 19, the respective flows at the outer circumferential side form a flow swirling in the counterclockwise direction. Meanwhile, flows formed inside the respective internal cylinders 19 near the central axis of the flow passage 11 swirl in the clockwise direction with respect to the central axis. When these flows are released into the flow passage 11 and combined with one another, one flow is formed around the central axis in the clockwise direction. Among the dashed arrows indicating the swirl directions of the fluid mixture 3 shown in the front view of FIG. 5A, the dashed arrow around the central axis indicates the swirl direction of the above flow. Due to this difference in the swirl direction between the central area and the outer area, a shearing action works between the two areas. This helps the mixing of the fluids.

As described above, the effects similar to the effects of the first embodiment can be also obtained through the present embodiment. The present embodiment is effective particularly in a case in which the flow volume of fluids is large.

Third Embodiment

Figure 6:
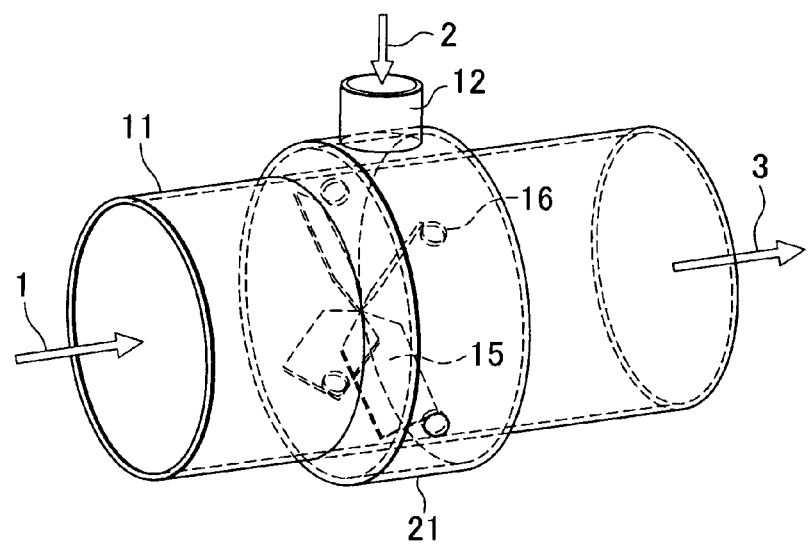
FIG. 6 is a perspective view of a third embodiment of the fluid mixing apparatus according to the present invention.
Figure 7A:
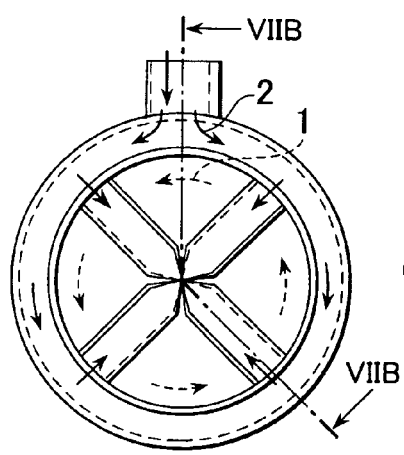
FIGS. 7A and 7B are a front view and a cross-sectional view of the third embodiment shown in FIG. 6, respectively.
Figure 7B:
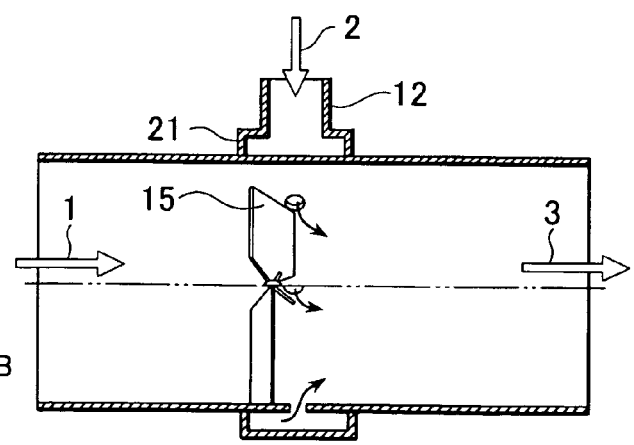

FIG. 6 is a perspective view of a fluid mixing apparatus according to a third embodiment of the present invention. FIG. 7A is a front view of the fluid mixing apparatus. FIG. 7B is a cross-sectional view of the fluid mixing apparatus cut along the VIIB-VIIB line shown in FIG. 7A. The components and objects of the present embodiment having the similar functions as the components and objects of the foregoing embodiments are indicated by the same reference numerals, and description thereof will be omitted.

The present embodiment is different from the first embodiment in that the swirl-generating stator 15 is directly joined to the inner circumferential surface of the flow passage 11, and that the internal cylinder 13 is not provided. The present embodiment is further different from the first embodiment in that the openings 16 serving as the inlets for the fluid 2 are formed on the wall surface of the flow passage 11, and that a ring-shaped duct 21, which serves as the header space for distributing the fluid 2 to the four openings 16, is provided for covering the outer circumference of the wall surface of the flow passage 11 to form a double tube.

The positional relationship between the openings 16 and the swirl-generating stator 15 in the present embodiment is the same as the positional relationship therebetween in the first embodiment. The openings 16 are formed on the wall surface of the flow passage 11 in contact with the flow separation areas formed as the fluid 1 runs into the vanes of the swirl-generating stator 15. In a case in which the internal cylinder 13 is not provided, as in the present embodiment, the cross-sectional area of the flow passage 11 for the fluid 1 is not reduced. Thus, the pressure loss of the fluid 1 can be reduced.

Unlike the first embodiment, in the front view of FIG. 7A in which the flow passage 12 is placed directly above the flow passage 11, the swirl-generating stator 15 is arranged to be tilted at an angle of 45° (i.e., arranged not crosswise but in an X-shape). With this configuration, the openings 16 are not located directly under the flow passage 12. Accordingly, the fluid 2 can be prevented from flowing only in the opening 16 located directly under the flow passage 12 by a larger amount than in the other openings 16. Further, the fluid 2 can reach the opening 16 located at the most distant position from the flow passage 12 by flowing from the flow passage 12 by an angle of 135° in the circumferential direction. The moving distance is shorter in this case than in the first embodiment in which the second fluid 2 needs to flow by an angle of 180°. This reduces a possibility that the flow volume of the fluid 2 distributed to the most distant opening 16 is decreased. Therefore, with this arrangement of the swirl-generating stator 15 at the tilt angle of 45°, the fluid 2 is distributed further evenly. This contributes to the even mixing of the fluid 1 and the fluid 2. This arrangement of the swirl-generating stator 15 is also applicable to the first embodiment. Further, a similar technique can be applied to a case in which the number of the vanes forming the swirl-generating stator 15 is a plural number other than four, such as three and six. That is, the fluid 2 can be evenly distributed by using the techniques of placing the openings 16 not directly under the flow passage 12, and avoiding formation of the openings 16 at the location most distant from the flow passage 12, for example.

As described above, the effects similar to the effects of the first embodiment can be also obtained through the present embodiment. In particular, the present embodiment has the effect of more evenly distributing the fluid 2 to evenly mix the fluid 1 and the fluid 2, and the effect of reducing the pressure loss of the fluid 1.

Fourth Embodiment

Figure 8:
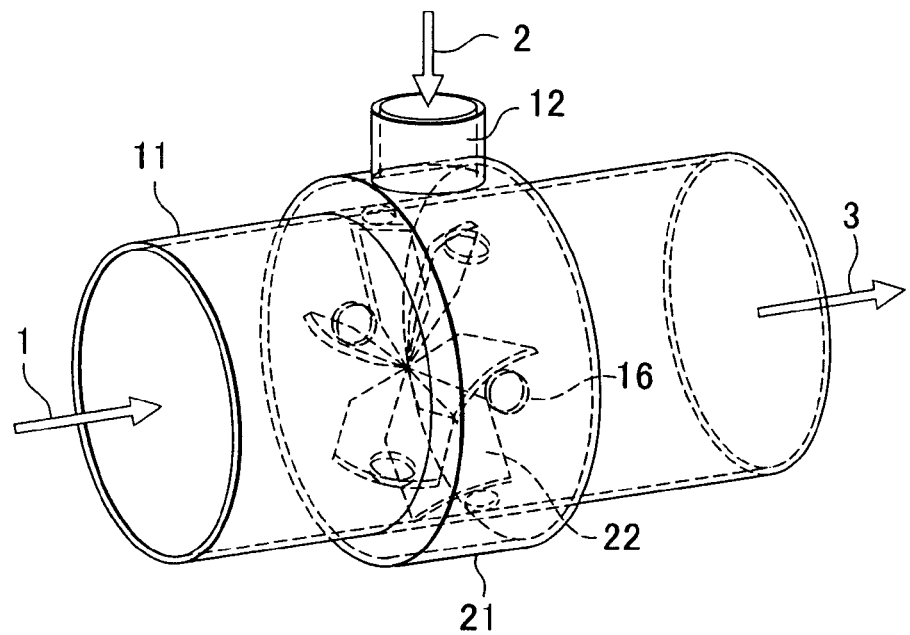
FIG. 8 is a perspective view of a fourth embodiment of the fluid mixing apparatus according to the present invention.
Figure 9A:
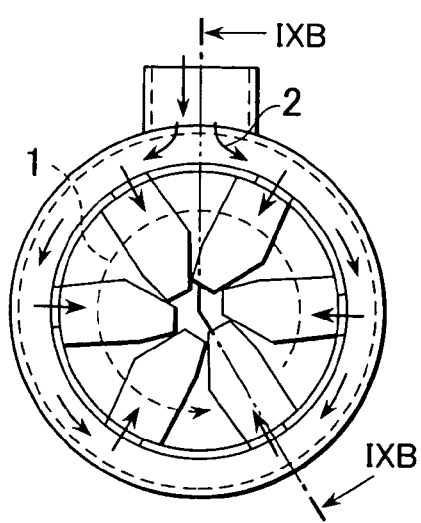
FIGS. 9A and 9B are a front view and a cross-sectional view of the fourth embodiment shown in FIG. 8, respectively.
Figure 9B:
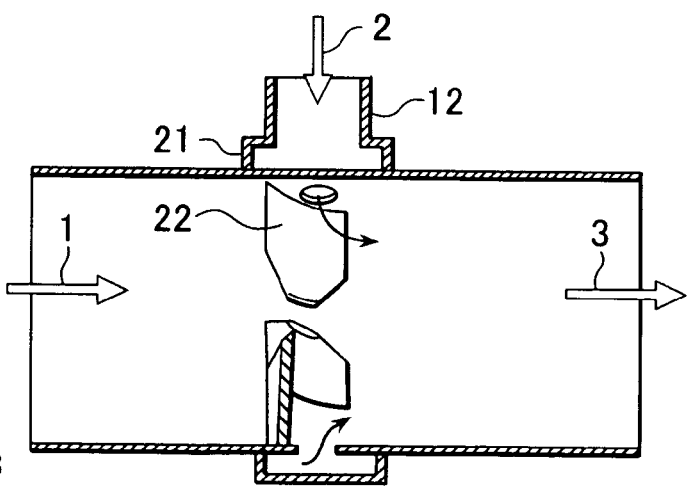

FIG. 8 is a perspective view of a fluid mixing apparatus according to a fourth embodiment of the present invention. FIG. 9A is a front view of the fluid mixing apparatus. FIG. 9B is a cross-sectional view of the fluid mixing apparatus cut along the IXB-IXB line shown in FIG. 9A. The components and objects of the present embodiment having the similar functions as the components and objects of the foregoing embodiments are indicated by the same reference numerals, and description thereof will be omitted.

The present embodiment is different from the third embodiment in that each of vanes forming a swirl-generating stator 22 is not formed by a flat plate but has a curvature, that the vanes are not joined with one another at the central axis side but are independently joined to the inner circumferential surface of the flow passage 11, and that the number of the vanes is six.

The curvature of each of the vanes forming the swirl-generating stator 22 is set to convex a surface of the vane opposite to a surface thereof at which the flow separation occurs. If a curvature inverse to the above is applied to the vane, the vane gently bends the flows. That is, the vane is formed into a shape which suppresses the flow separation. In the present embodiment, the angle of attack of the leading edge of the vane is increased to promote the flow separation, and the rest part of the vane is bent to return in a direction of the flow of the fluid 1 to reduce the swirling force. To increase the flow volume of the fluid 2 in the flow volume ratio between the fluid 1 and the fluid 2, it is preferable to increase the flow separation area formed at the vane. To increase the flow separation area, increasing the angle of attack of the vane with respect to the flow of the fluid 1 is effective. If the angle of attack is increased, however, the swirl flow is intensified, and thus the pressure loss of the fluid 1 is increased.

To increase the flow separation area without increasing the pressure loss of the fluid 1, it is desirable to increase the angle of attack of the vane while preventing the swirl flow from being excessively intensified. To achieve this, the angle of attack of the vane at the upstream side is set to be different from an inflow angle at the exit side. That is, the angle of attack of the leading edge of the vane at the upstream side is not maintained also at the edge of the vane at the downstream side. Instead, the vane is configured to have the curvature, and the angle of the vane is reversed in the direction of the flow of the fluid 1. Thereby, large swirling force is not applied to the fluid 1. As the flow separation area formed at the vane is thus increased, the bore of each of the openings 16 can be increased. As a result, the pressure loss is not increased even if the flow volume of the fluid 2 is increased. In addition, the increase in the number of the vanes leads to the increase in the number of the openings 16 and the increase in the total opening area, and thus contributes to the reduction of the pressure loss cased by the influx of the fluid 2.

Further, the vanes of the swirl-generating stator 22 are not joined to one another at the central axis side. Therefore, the central region of the flow passage 11 has no obstacle, and thus the pressure loss of the fluid 1 can be reduced.

As described above, the effects similar to the effects of the first embodiment can be also obtained through the present embodiment. In particular, the present embodiment has such effects as preventing the increase of the pressure loss even if the flow volume of the fluid 2 is increased, reducing the pressure loss caused by the influx of the fluid 2, and reducing the pressure loss of the fluid 1.

Fifth Embodiment

Figure 10:
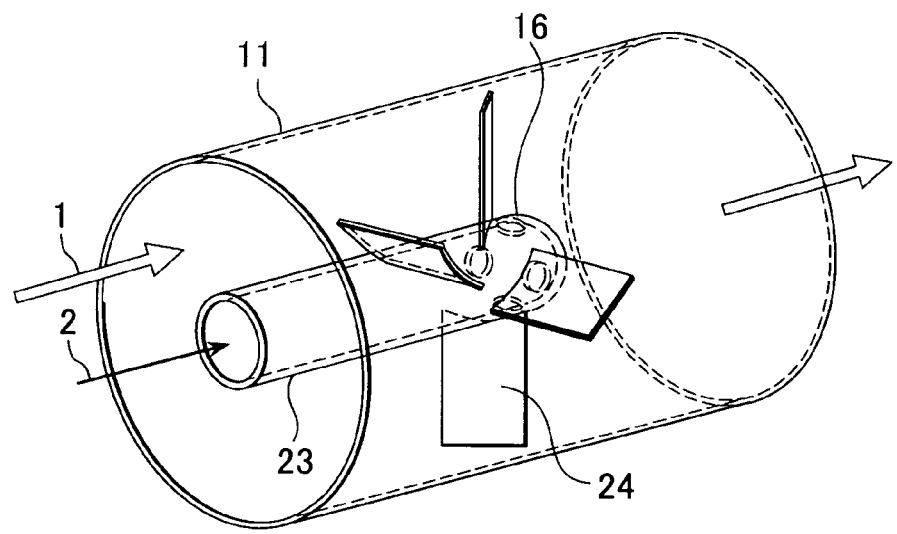
FIG. 10 is a perspective view of a fifth embodiment of the fluid mixing apparatus according to the present invention.
Figure 11A:
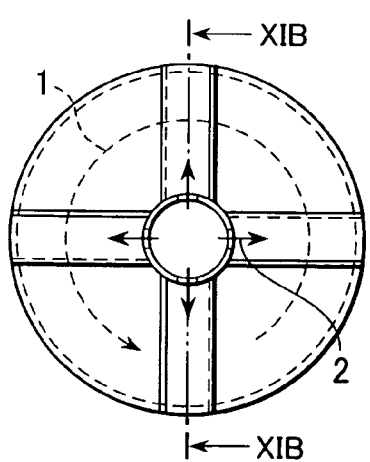
FIGS. 11A and 11B are a front view and a cross-sectional view of the fifth embodiment shown in FIG. 10, respectively.
Figure 11B:
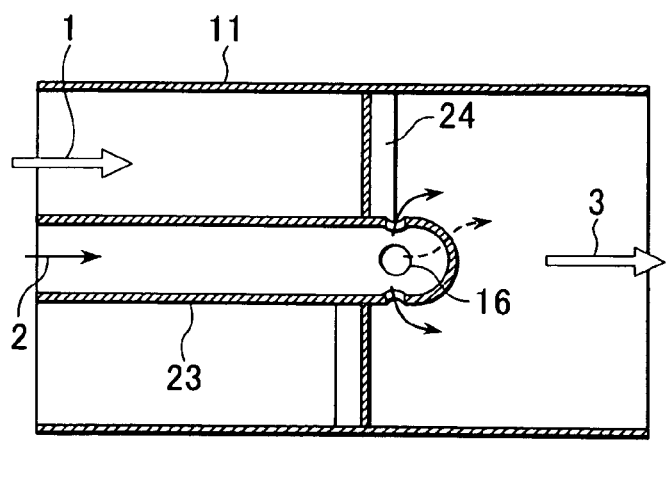

FIG. 10 is a perspective view of a fluid mixing apparatus according to a fifth embodiment of the present invention. FIG. 11A is a front view of the fluid mixing apparatus. FIG. 11B is a cross-sectional view of the fluid mixing apparatus cut along the XIB-XIB line shown in FIG. 11A.

As in the cases of the foregoing embodiments, the present embodiment also mixes the fluid 1 and the fluid 2 while passing the two fluids therethrough. The present embodiment includes the flow passage 11, a second fluid flow passage (hereinafter referred to as a flow passage 23), a swirl-generating stator 24, and four openings 16. The fluid 1 flows into the flow passage 11 of a cylindrical shape. The fluid 2 flows into the tube-shaped flow passage 23 which is concentrically placed inside the flow passage 11 along the flow passage axis line to form a double tube. The swirl-generating stator 24 includes four vanes arranged radially and crosswise between the outer circumferential surface of the flow passage 23 and the inner circumferential surface of the flow passage 11. The four openings 16 are formed on a wall surface of the flow passage 23 at positions in contact with the flow separation areas of the fluid 1 formed by the swirl-generating stator 24. Through the four openings 16, the inside and the outside of the flow passage 23 communicate with each other. The flow passage 23 pierces through a wall surface of the flow passage 11, and is connected to a duct (not illustrated) which supplies the fluid 2 to the flow passage 23.

End peripheries of the swirl-generating stator 24 at the central axis side are closely attached to the outer circumferential surface of the flow passage 23, while end peripheries of the swirl-generating stator 24 at the outer circumferential side in the radial direction are in contact with the inner circumferential surface of the flow passage 11. The flow passage 23 is closed by a semispherical cover member at a side farther away from the swirl-generating stator 24 than from the openings 16. Thus, the flow passage 23 does not extend downstream from the point on. As the fluid 1 and the fluid 2 are mixed at the downstream side of the swirl-generating stator 24, the fluid mixture 3 is formed and flows into a space in the flow passage 11 where the flow passage 23 does not exist.

As in the cases of the foregoing embodiments, the swirl-generating stator 24 swirls the inflowing fluid 1 and forms the flow separation areas at the back side (i.e., the downstream surface side) of the vanes. The fluid 2 flowing in the flow passage 23 flows into the flow separation areas through the openings 16. As the fluid 2 flows into the flow separation areas, the fluid 2 is diffused in the direction of intersecting the flow of the fluid 1, i.e., in the radial direction of the flow passage 11, without being immediately swept away by the fluid 1. Thereby, the fluid 2 moves from the center side to reach the vicinity of the inner circumferential wall of the flow passage 11. Thereafter, the fluid 2 is also diffused in the circumferential direction due to the swirling action of the fluid 1. As a result, the mixing of the fluid 1 and the fluid 2 is promoted.

The effects similar to the effects of the first embodiment can be also obtained through the present embodiment. In particular, no component is attached to the outer circumferential area of the fluid mixing apparatus according to the present embodiment. Therefore, the present embodiment has an effect of being provided even in a small space.

Sixth Embodiment

Figure 12:
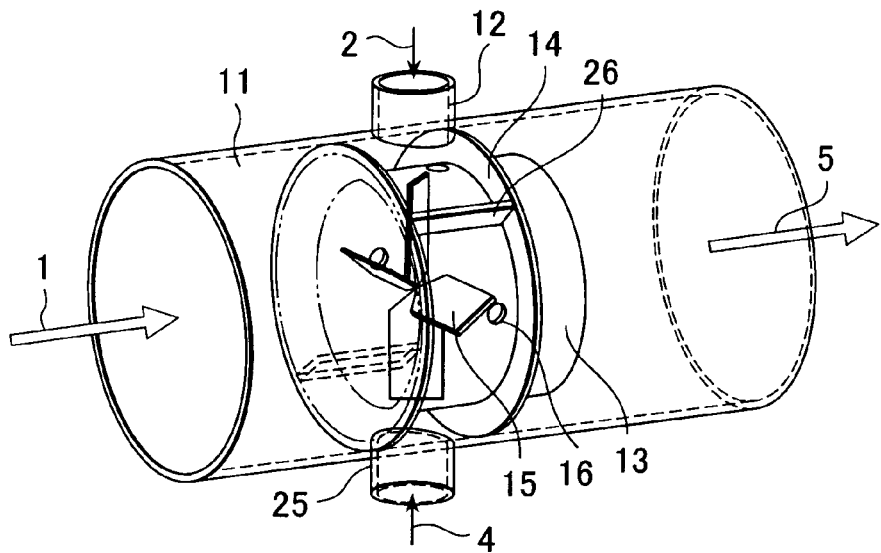
FIG. 12 is a perspective view of a sixth embodiment of the fluid mixing apparatus according to the present invention.
Figure 13A:
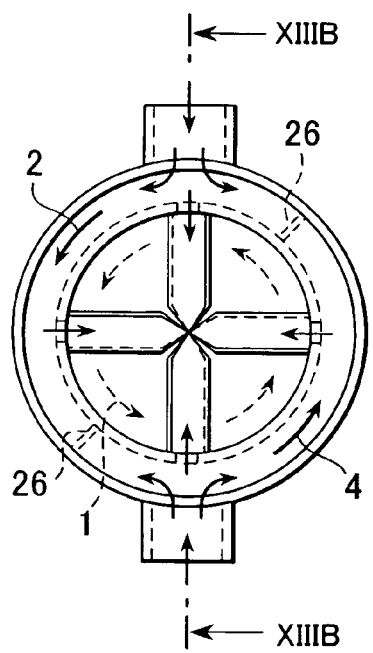
FIGS. 13A and 13B are a front view and a cross-sectional view of the sixth embodiment shown in FIG. 12, respectively.
Figure 13B:
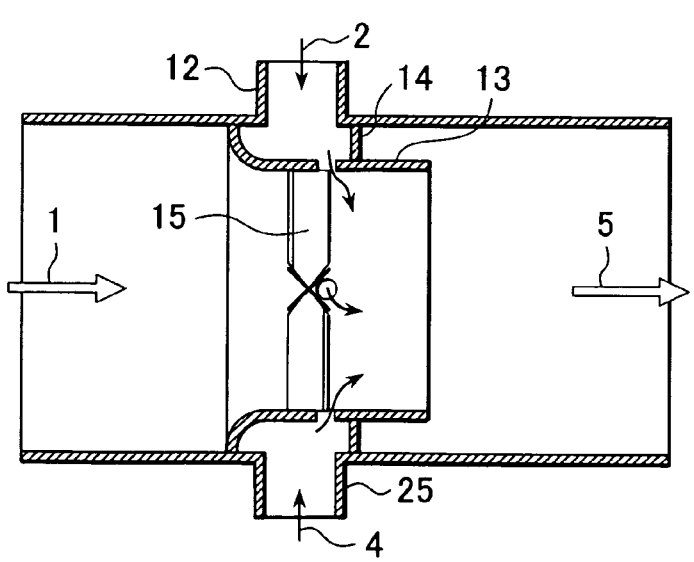

FIG. 12 is a perspective view of a fluid mixing apparatus according to a sixth embodiment of the present invention. FIG. 13A is a front view of the fluid mixing apparatus. FIG. 13B is a cross-sectional view of the fluid mixing apparatus cut along the XIIIB-XIIIB line shown in FIG. 13A. The present embodiment is different from the first embodiment in that an opening is formed on the wall surface of the flow passage 11 at a position opposite to the flow passage 12 to be connected to a flow passage 25, and that two separation walls 26 are provided for dividing the toric header space into a section connected to the flow passage 12 and a section connected to the flow passage 25. Each of the two sections is formed with the same number of the openings 16. The present embodiment is the same in configuration as the first embodiment, except for the above-described respects. Therefore, the components and objects of the present embodiment similar to the components and objects of the first embodiment are assigned with the same reference numerals, and description thereof will be omitted.

With the above-described configuration, the present embodiment is capable of mixing another type of fluid, i.e., a fluid 4, in addition to the fluid 1 and the fluid 2. To mix fluids of three or more types, the fluid mixing apparatuses according to the first to fourth embodiments may be placed in series so that the different types of fluids are sequentially mixed. Alternatively, the internal cylinder 13 may be shared by a plurality of the swirl-generating stators 15 placed in series so that a different type of fluid is added and mixed at each one of the swirl-generating stators 15. The present embodiment is effective in further downsizing the fluid mixing apparatus.

In the present embodiment, the toric header space, which is sandwiched by the internal cylinder 13 and the divider plate 14 to serve as the header, is connected to the flow passage 12 which introduces the fluid 2 and to the flow passage 25 which introduces the fluid 4. With this configuration, the single swirl-generating stator 15 can mix two types of fluids into the fluid 1 and thus mix a total of three types of fluids at the same time. Further, since the separation walls 26 are provided in the header space, the fluid 2 and the fluid 4 can be prevented from flowing into the flow passage 25 and the flow passage 12, respectively.

The effects similar to the effects of the first embodiment can be also obtained through the present embodiment. In particular, the present embodiment has the effect of mixing three types of fluids in a small space.

In any one of the first to sixth the embodiments, the fluid 1 generates the negative pressure which is used as the driving force to supply the fluid 2. A similar effect can be obtained also by applying pressure to the fluid 2 (i.e., the input fluid). By so doing, the amount of the negative pressure of the fluid 1 to be generated is reduced, and thus the pressure loss can be reduced.

Seventh Embodiment

Figure 14:
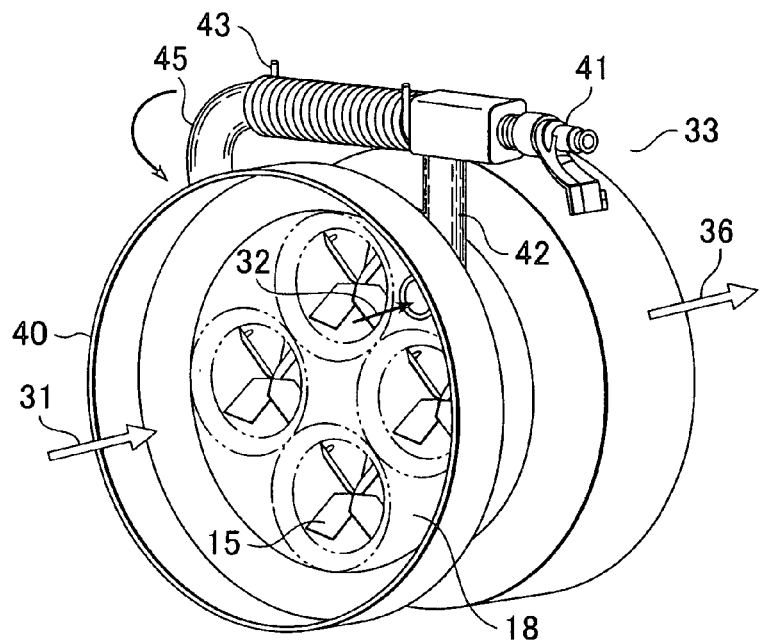
FIG. 14 is a perspective view of a seventh embodiment of the fluid mixing apparatus according to the present invention.
Figure 15A:
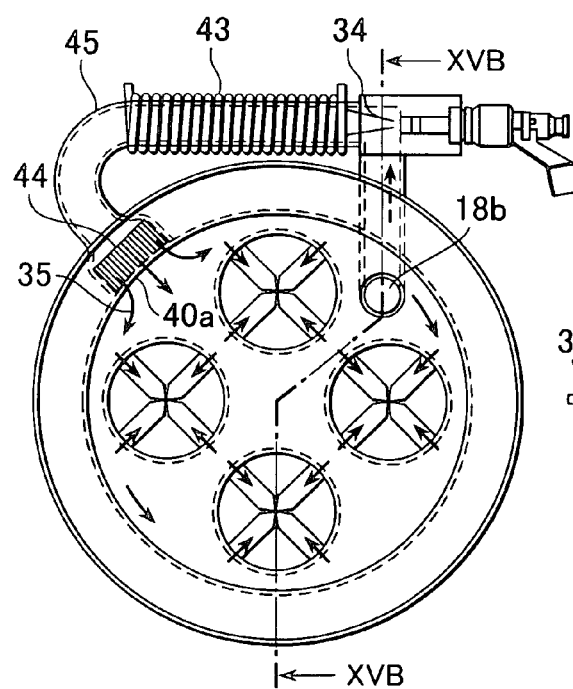
FIGS. 15A and 15B are a front view and a cross-sectional view of the seventh embodiment shown in FIG. 14, respectively.
Figure 15B:
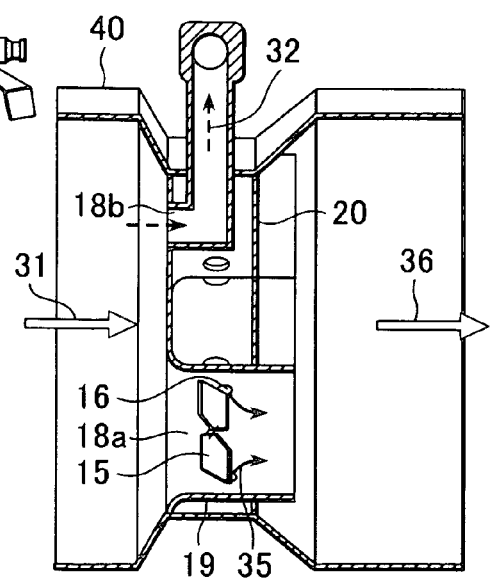

FIG. 14 is a perspective view of a urea water dosing device, which is a seventh embodiment of the fluid mixing apparatus according to the present invention. FIG. 15A is a front view of the urea water dosing device. FIG. 15B is a cross-sectional view of the urea water dosing device cut along the XVB-XVB line shown in FIG. 15A. The urea water dosing device illustrated in the drawings is used in a urea-SCR system which is used to decompose NOx contained in the exhaust gas of a diesel engine.

The urea water dosing device illustrated in the drawings includes a trunk 40, the flat plate 18, the divider plate 20, four openings 18a, four openings 20a, the four internal cylinders 19, the swirl-generating stators 15, the openings 16, a urea supply pipe 45, an injector 41, a divided gas flow passage 42, a heater 43, and a hydrolysis catalyst 44. The trunk 40 of a cylindrical shape includes a portion having a diameter decreased to a certain value (hereinafter referred to as a decreased-diameter portion) at an intermediate portion thereof in the longitudinal direction. The flat plate 18 is attached to an upstream end of the decreased-diameter portion (at the left side in FIG. 14) to seal an axial cross-section of the trunk 40 in a direction perpendicular to the longitudinal direction of the trunk 40. The divider plate 20 is placed in parallel to the flat plate 18 and is attached to a downstream end of the decreased-diameter portion (at the right side in FIG. 14) to seal another axial cross-section of the trunk 40. The four openings 18a are equal in size and formed on the flat plate 18 evenly and discretely in the circumferential direction. The four openings 20a are formed on the divider plate 20 such that the centers of the openings 20a are points on the divider plate 12 intersecting with lines extended downstream from the centers of the openings 18a in parallel to the axis line of the trunk 40. Each of the four internal cylinders 19 has an end portion which has an increased diameter and is fit in the corresponding one of the openings 18a, and a cylinder portion which is fit in and fixed to the corresponding one of the openings 20a. Each of the swirl-generating stators 15 includes four vanes and is fixed inside the corresponding one of the internal cylinders 19. The openings 16 are formed on the wall surface of each of the internal cylinders 19 at positions in contact with the flow separation areas formed at the downstream surface side of the respective vanes. The urea supply pipe 45 has a downstream end connected to an opening 40a which is formed on the wall surface of the decreased-diameter portion of the trunk 40. The injector 41 is attached to an upstream end of the urea supply pipe 45 to inject urea water 33 into the urea supply pipe 45. The divided gas flow passage 42 connects an opening 18b formed on the flat plate 18 to a position of the urea supply pipe 45 at which spray 34 is formed by the injector 41 so that an upstream side section of the flat plate 18 communicates with the urea supply pipe 45. The heater 43 is attached to a portion of the urea supply pipe 45 at the downstream side of a connecting position at which the urea supply pipe 45 is connected to the divided gas flow passage 42. The hydrolysis catalyst 44 is provided inside a portion of the urea supply pipe 45 connected to the opening 40a. In each of the internal cylinders 19, the outer circumferential surface of the increased-diameter end portion is closely attached and fixed to the inner circumferential surface of the corresponding one of the openings 18a, and the outer circumferential surface of the cylinder portion is closely attached and fixed to the inner circumferential surface of the corresponding one of the openings 20a.

In the urea-SCR system according to the present embodiment, the urea water 33 is injected by the injector 41, and the injected urea water 33 is heated by the heater 43 and evaporated. As the evaporated urea water 33 passes through the hydrolysis catalyst 44, a decomposition reaction by urea and water occurs. Thereby, ammonia gas 35 is generated. The ammonia gas 35 is mixed into exhaust gas 31 through the fluid mixing apparatus according to the present embodiment. Then, a gas mixture 36 obtained by evenly mixing the ammonia gas 35 into the exhaust gas 31 is passed through an SCR catalyst (Selective Catalytic Reduction catalyst, which is not illustrated in the drawings), and ammonia reduces NOx to nitrogen gas. Accordingly, NOx contained in the exhaust gas can be reduced.

Further, if a gas serving as a medium exists, the urea water is easily evaporated. Therefore, the exhaust gas 31 is divided so that a part of the exhaust gas 31 flows into the divided gas flow passage 42 and is sent to the urea supply pipe 45 as a divided gas flow 32. Then, the divided gas flow 32 is used as the medium. The action of the medium will now be described in another example. To generate water vapor of 1 atm in a space containing solely water, the temperature needs to be equal to or higher than 100° C. Meanwhile, in the air of 1 atm, water evaporates even at room temperature. As in the case of this example, if the divided gas flow 32 exists around the urea water 33, evaporation of the urea water 33 is promoted.

In the present embodiment, the exhaust gas 31, which is the first fluid 1, is mixed with the ammonia gas 35, which is the fluid 2. The exhaust gas 31 is sent into the trunk 40 from the left side in FIG. 14. A majority of the exhaust gas 31 is divided to flow into the four internal cylinders 19 which are connected to the openings 18a formed on the flat plate 18. Meanwhile, a part of the exhaust gas 31 flows into the divided gas flow passage 42 which has the opening 18b, i.e., an entrance formed on the flat plate 18, and the divided gas flow 32 is formed. The divided gas flow 32 flowed in the divided gas flow passage 42 is supplied to the upstream end of the urea supply pipe 45 and receives the urea water 33 injected by the injector 41.

The injector 41, which injects the urea water 33 into the divided gas flow 32, receives the supply of the urea water 33 applied with pressure of approximately 5 atms. The injector 41 functions as an on-off valve for the urea water 33, and controls the flow volume of the urea water 33 by adjusting a valve opening time. Then, through minute injection holes formed at an exit, the injector 41 injects the urea water 33 into the divided gas flow 32 which flows from the divided gas flow passage 42 into the upstream end of the urea supply pipe 45. This injection of the urea water 33 generates the spray 34 in which the urea water 33 is atomized. As the urea water 33 is atomized, the surface area thereof is substantially increased, and the urea water 33 is easily evaporated. An engine exhaust gas usually has a high temperature of equal to or higher than 100° C. Therefore, a latent heat necessary for the evaporation of the urea water 33 is partially supplied by the divided gas flow 32, and an evaporated gas is generated. However, if the urea water 33 is evaporated solely by the sensible heat of the divided gas flow 32, the temperature of the evaporated gas is decreased, and a hydrolysis reaction tends to be suppressed. Thus, it is desirable to heat the urea water 33 by the heater 43.

When the evaporated gas is at a temperature of approximately 300° C., water vapor exists. Thus, the hydrolysis reaction of urea naturally occurs. However, the temperature of the evaporated gas does not increase so much in many cases. Therefore, the evaporated gas is introduced to the hydrolysis catalyst 44 through the urea supply pipe 45, and the hydrolysis reaction is promoted at a low temperate by use of the hydrolysis catalyst 44. The hydrolysis reaction converts urea into ammonia and carbon dioxide. The following description will be made focusing only on an ammonia gas used as a NOx reductant. The ammonia gas 35, which is generated as the evaporated gas passes through the hydrolysis catalyst 44, is discharged from the hydrolysis catalyst 44 and fills the header space enclosed by the flat plate 18, the divider plate 20, the outer circumferential surfaces of the internal cylinders 19, and the inner circumferential surface of the decreased-diameter portion of the trunk 40. Then, through the openings 16 formed at the total of sixteen locations on the wall surfaces of the internal cylinders 19, the ammonia gas 35 flows into the flow separation areas formed at the downstream side of the swirl-generating stator 15 in each of the internal cylinders 19.

Meanwhile, the exhaust gas 31 flowed into the four internal cylinders 19 through the openings 18a is swirled by the respective swirl-generating stators 15. The number of the internal cylinders 19, which is four in the present embodiment, can be changed to one as in the case of the first embodiment or to another number. Similarly, the number of the vanes of the swirl-generating stator 15, which is four in the present embodiment, can be changed to another number. As the exhaust gas 31 runs into each of the swirl-generating stators 15, the flow separation areas are formed at the downstream surface side of the respective vanes. Then, as described above, the ammonia gas 35 is supplied by the negative pressure generated in the flow separation areas.

The ammonia gas 35 is generated by using the divided gas flow 32 divided from the exhaust gas 31. Therefore, as well as the ammonia gas 35, the divided gas flow 32 also flows into the flow separation areas. To cause the divided flows of the exhaust gas 31 to pass through different flow passages and merge together again at one place, the pressure drop needs to be the same between the two types of flow passages. Otherwise, the pressure balance is lost, and the static state cannot be obtained. Practically, therefore, the flow volume distribution between the divided gas flow 32 and the exhaust gas 31 flowing in the internal cylinders 19 is settled such that the pressures in the two types of flow passages are balanced.

In the present apparatus, the divided gas flow passage 42 has a bent portion. Further, the flow volume is increased due to the dosing of the urea water 33, and the catalyst passes through the divided gas flow passage 42. Therefore, the divided gas flow passage 42 has many factors for decreasing the pressure, compared with the flow passage in which the exhaust gas 31 directly flows into the internal cylinders 19. To make a flow volume ratio of the divided gas flow 32 to the exhaust gas 31 at an appropriate value under the above-described conditions, the pressure drop needs to be increased in the flow passage in which the exhaust gas 31 directly flows into the internal cylinders 19. If the pressure is not recovered after this pressure drop, the entirety of the pressure drop forms the pressure loss, i.e., the energy is lost. The sum of the flow passage cross-sectional areas of the internal cylinders 19 is set to be smaller than the flow passage cross-sectional area of the trunk 40 at an upstream position of the internal cylinders 19 to decrease the static pressure. Further, the swirl-generating stators 15 cause the flow separation which generates the negative pressure. The above configurations are effective in reducing the pressure loss. This is because, after the pressure drop, the pressure can be recovered to a certain degree as the velocity energy is converted again into the pressure energy.

In each of the internal cylinders 19, the ammonia gas 35 flowing in the flow separation areas formed at the downstream side of the swirl-generating stator 15 is first diffused in a direction along the vanes, and then swirls and flows together with the exhaust gas 31. As a result, the mixing of the exhaust gas 31 and the ammonia gas 35 is promoted, and the gas mixture 36 is formed. Divided flows of the gas mixture 36 flowing in parallel to one another in the four internal cylinders 19 are again discharged into the space in the trunk 40 and merge together. In this process, the swirl flows formed in the internal cylinders 19 are also combined. Thus, the gas mixture 36 swirls in opposite directions between the outer circumferential side and the center side of the trunk 40, which further promotes the mixing of the exhaust gas 31 and the ammonia gas 35. As a result, the ammonia gas 35 is diffused in the exhaust gas 31 at an even density. As the gas mixture 36 containing the thus diffused ammonia gas 35 is flowed through the SCR catalysis (not illustrated), NOx contained in the exhaust gas 31 is reduced. Accordingly, the NOx emission amount can be reduced.

Eighth Embodiment

Figure 16:
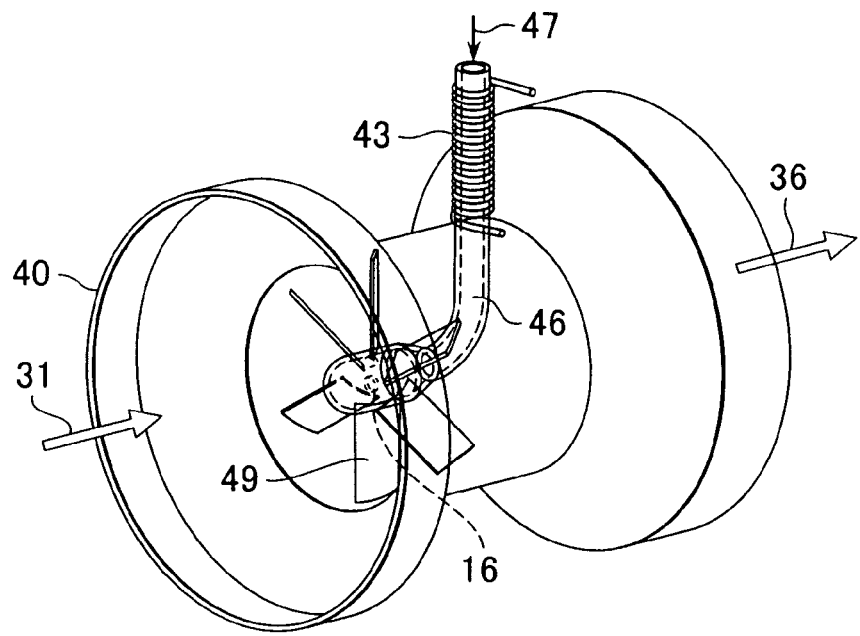
FIG. 16 is a perspective view of an eighth embodiment of the fluid mixing apparatus according to the present invention.
Figure 17A:
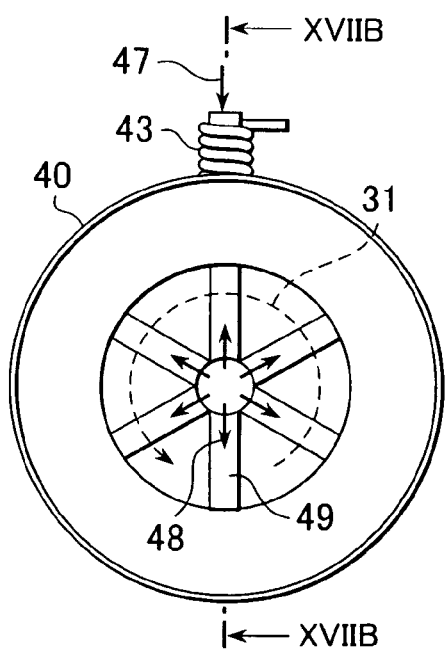
FIGS. 17A and 17B are a front view and a cross-sectional view of the eighth embodiment shown in FIG. 16, respectively.
Figure 17B:
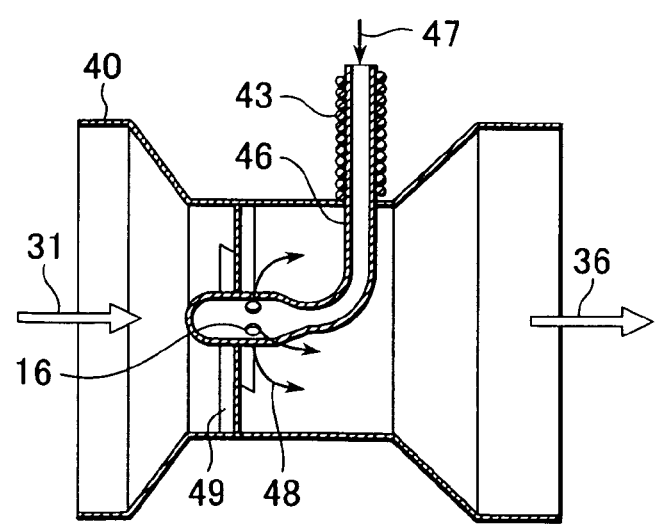
Figure 19A:
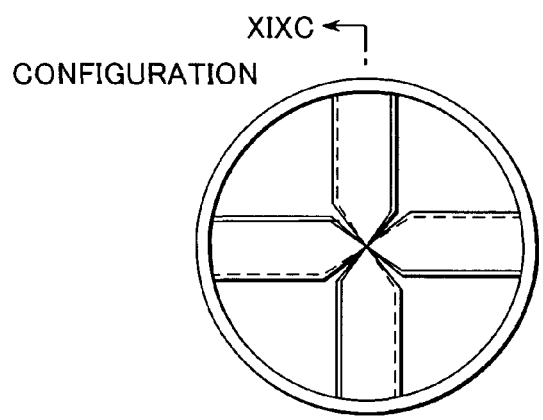
FIGS. 19A to 19D are diagrams illustrating a second example of the flow separation area formed in the case in which flat plates are used to form the swirl-generating stator.
Figure 19B:
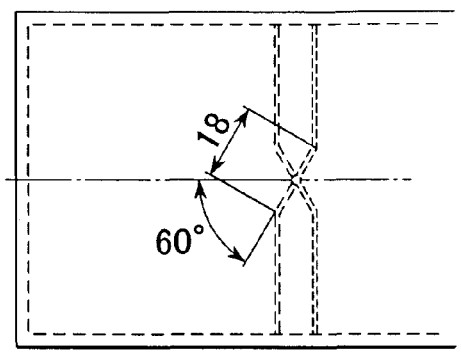
Figure 19C:
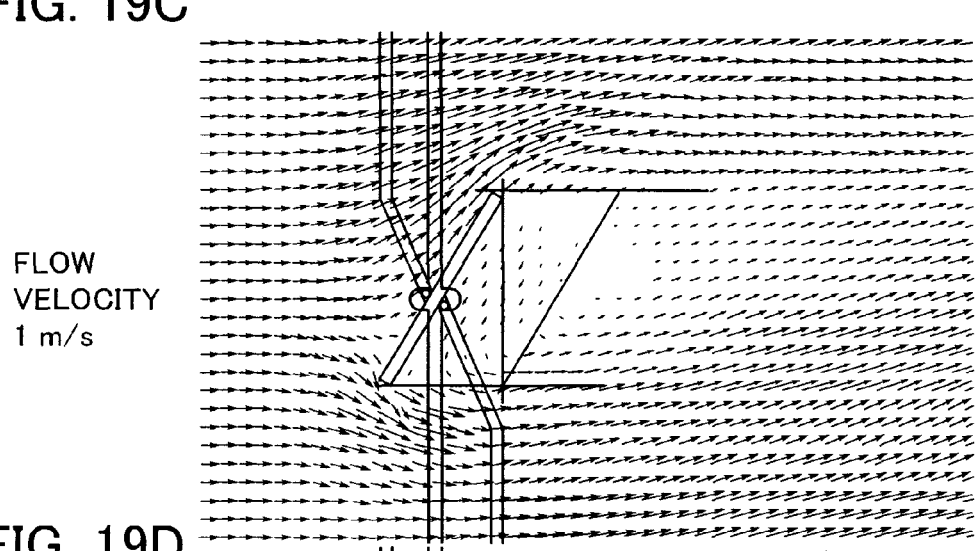
Figure 19D:
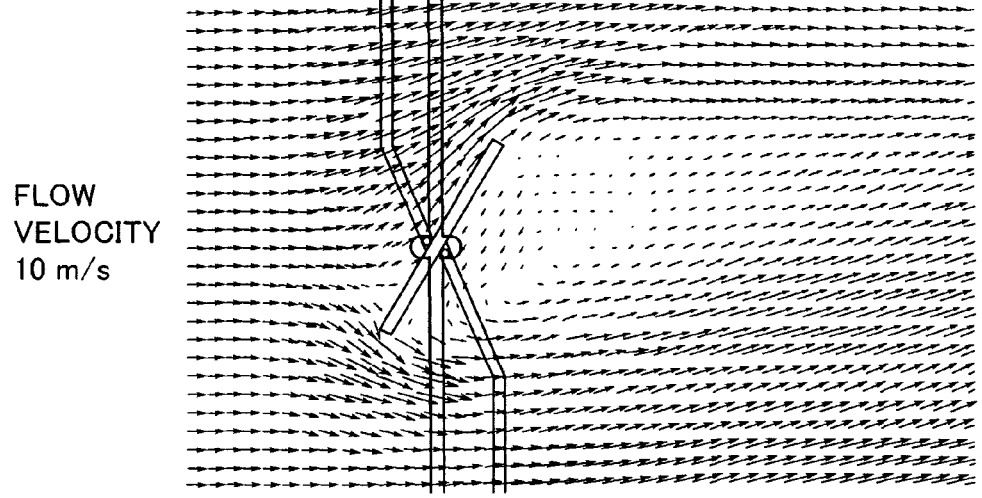
Figure 20A:
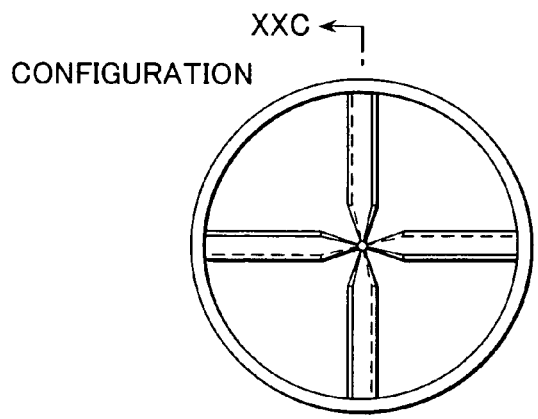
FIGS. 20A to 20D are diagrams illustrating a third example of the flow separation area formed in the case in which flat plates are used to form the swirl-generating stator.
Figure 20B:
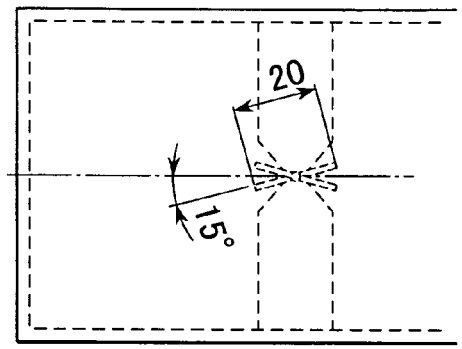
Figure 20C:
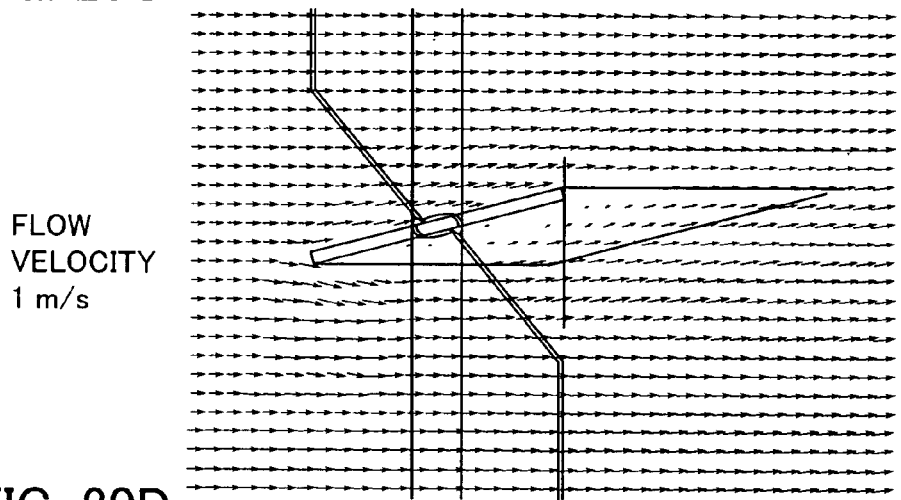
Figure 20D:
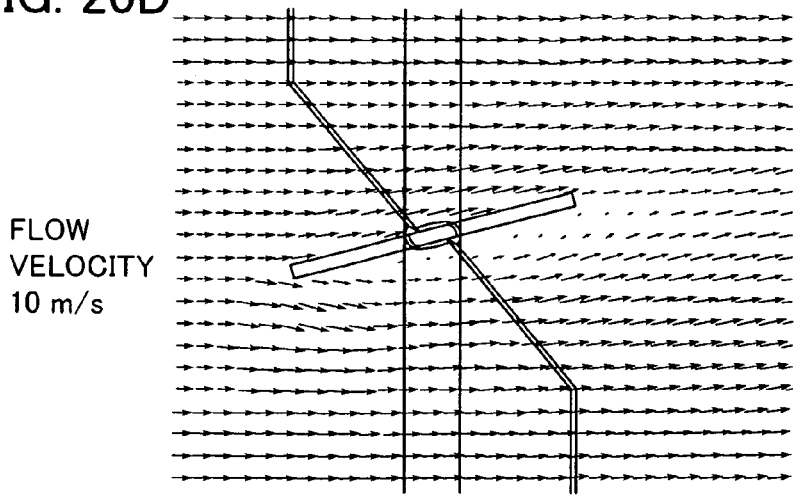
Figure 22A:
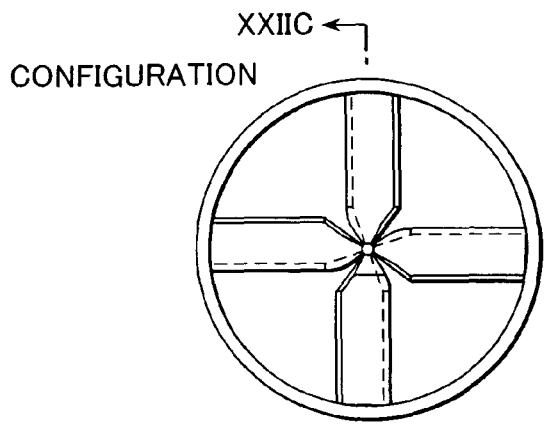
FIGS. 22A to 22D are diagrams illustrating a first example of the flow separation area formed in a case in which curved plates convexed toward the upstream side are used to form the swirl-generating stator.
Figure 22B:
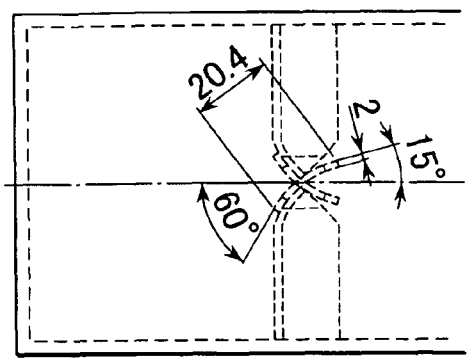
Figure 22C:
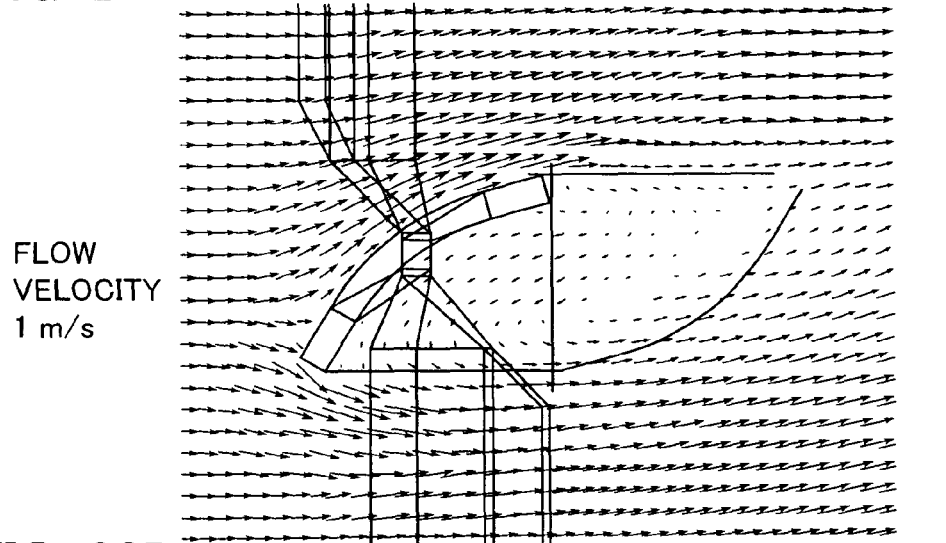
Figure 22D:
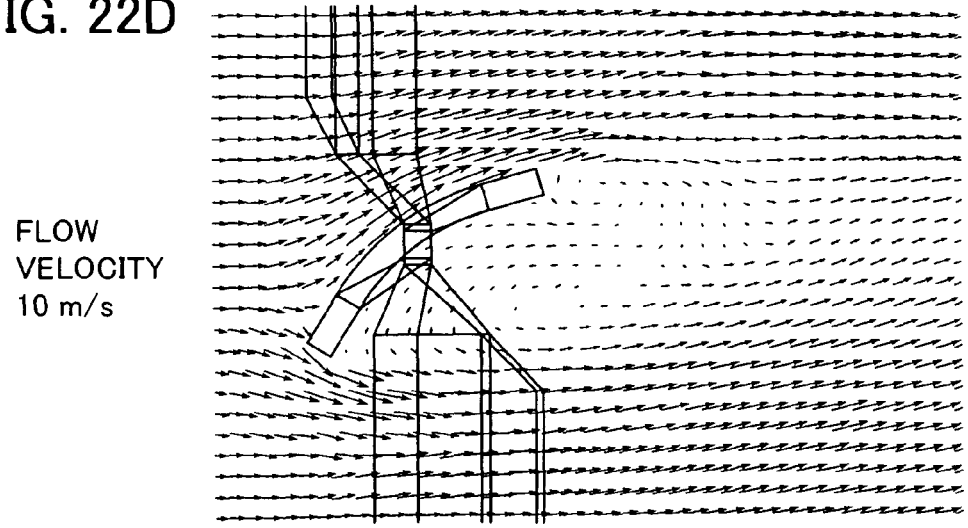
Figure 23A:
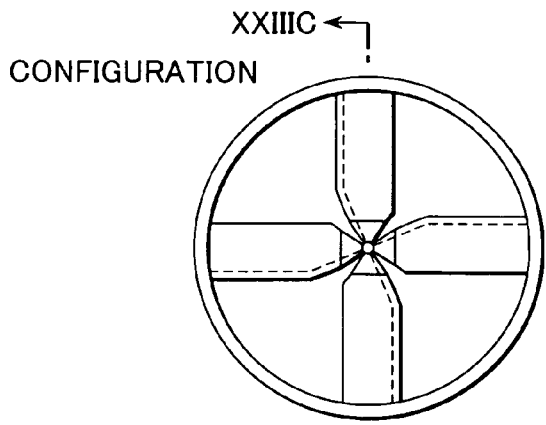
FIGS. 23A to 23D are diagrams illustrating a second example of the flow separation area formed in the case in which curved plates convexed toward the upstream side are used to form the swirl-generating stator.
Figure 23B:
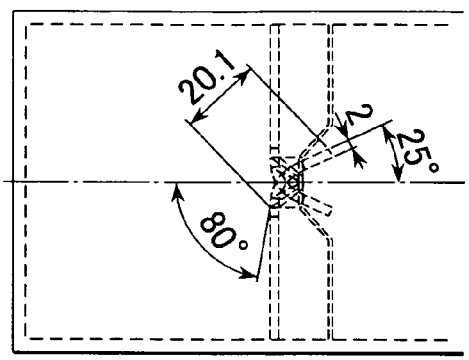
Figure 23C:
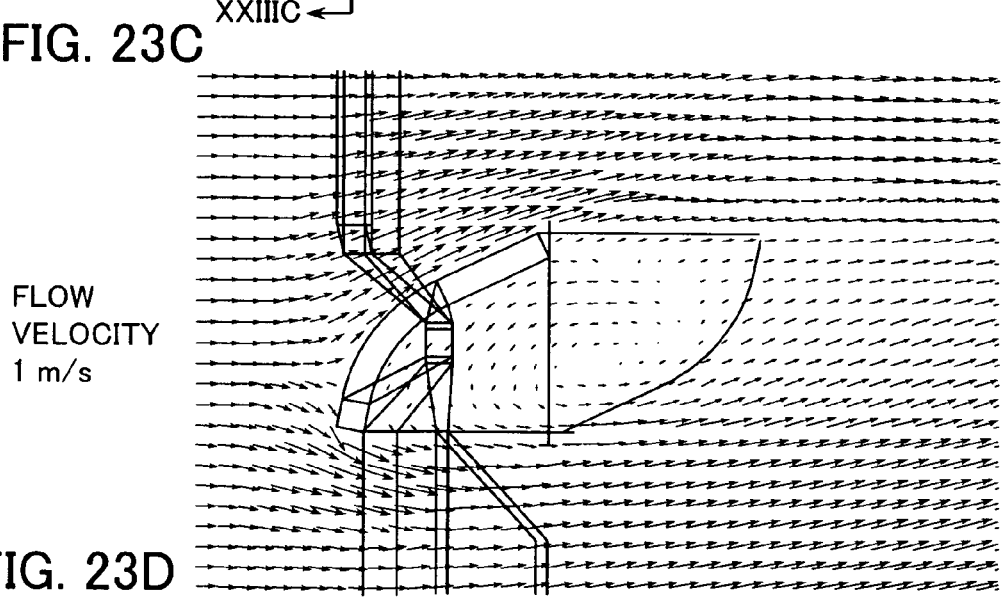
Figure 23D:
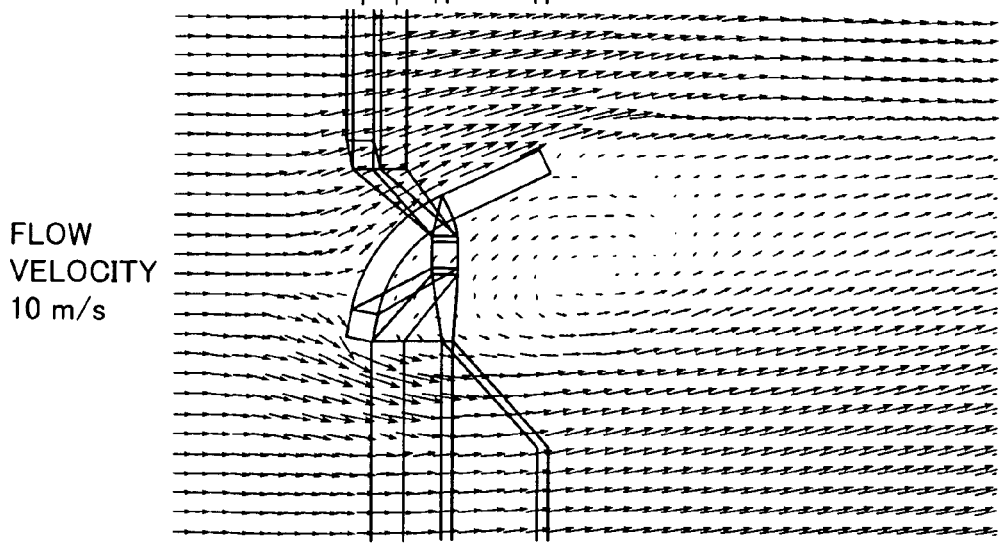
Figure 24A:
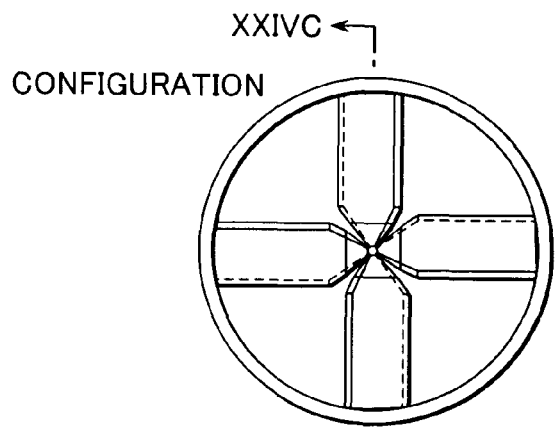
FIGS. 24A to 24D are diagrams illustrating a first example of the flow separation area formed in a case in which curved plates convexed toward the downstream side are used to form the swirl-generating stator.
Figure 24B:
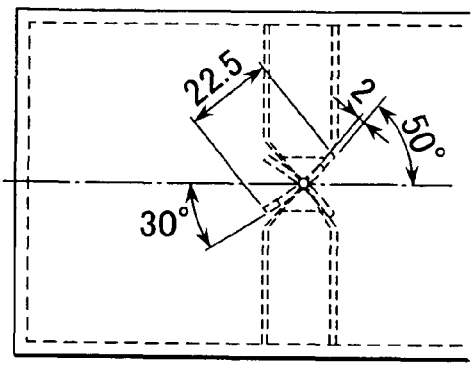
Figure 24C:
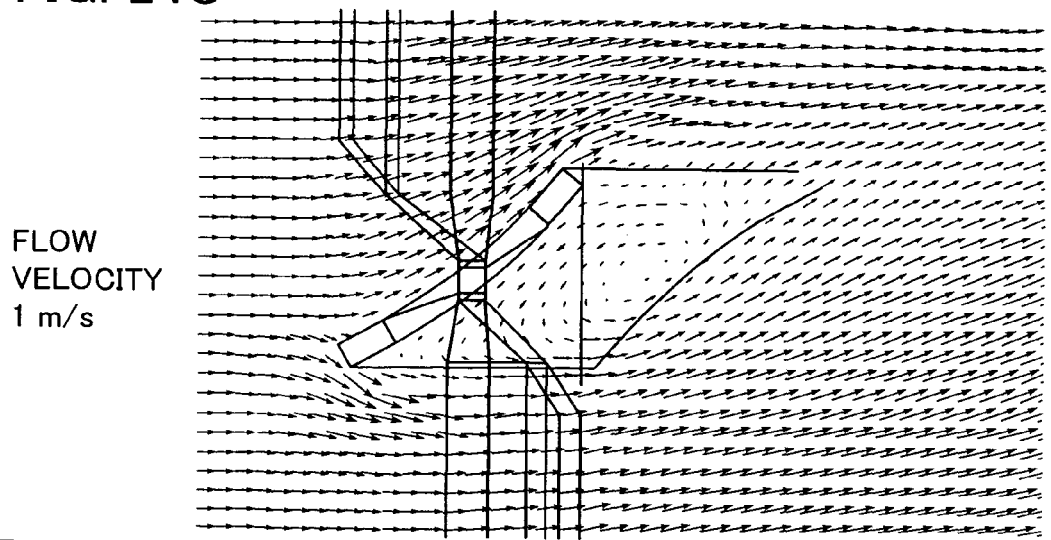
Figure 24D:
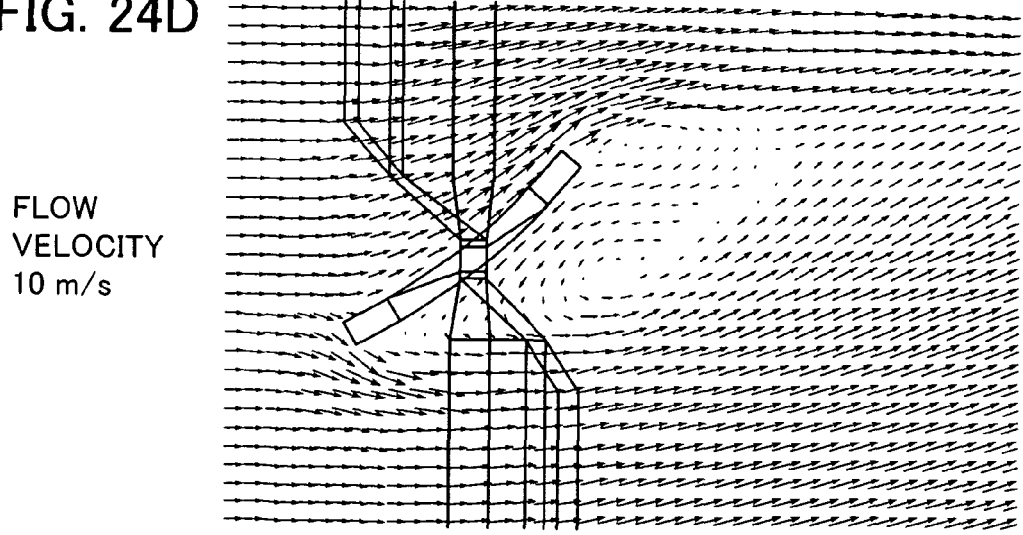
Figure 25A:
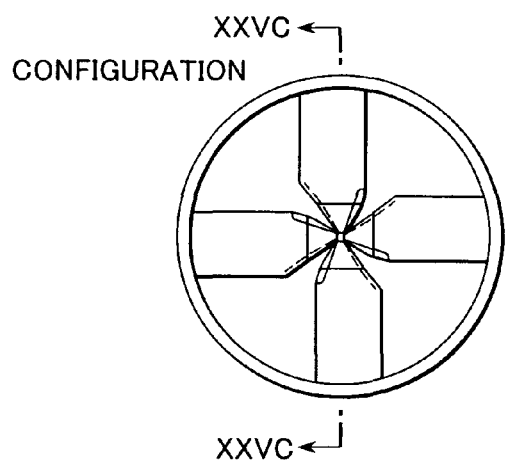
FIGS. 25A to 25D are diagrams illustrating a second example of the flow separation area formed in the case in which curved plates convexed toward the downstream side are used to form the swirl-generating stator.
Figure 25B:
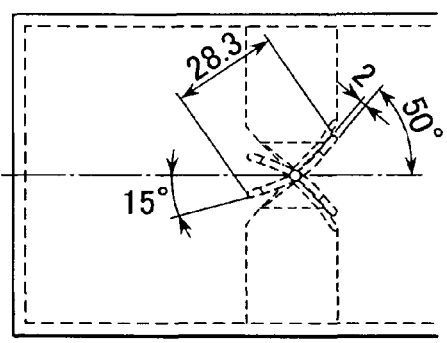
Figure 25C:
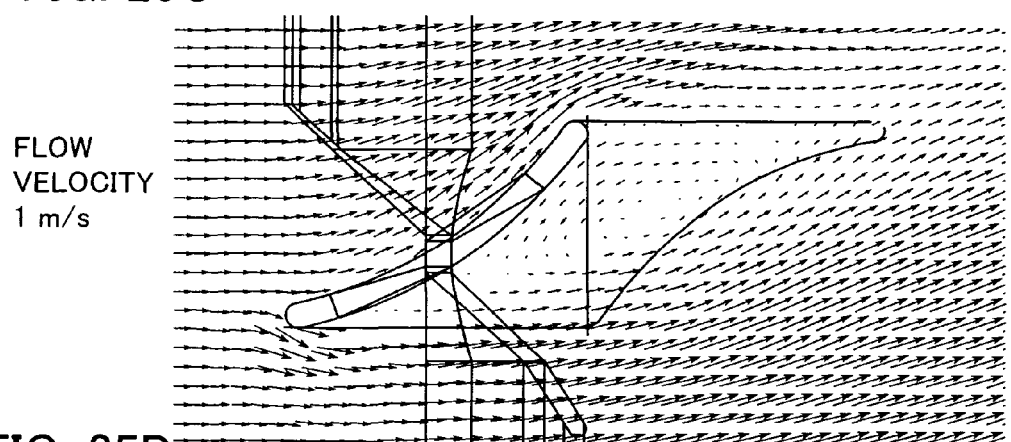
Figure 25D:
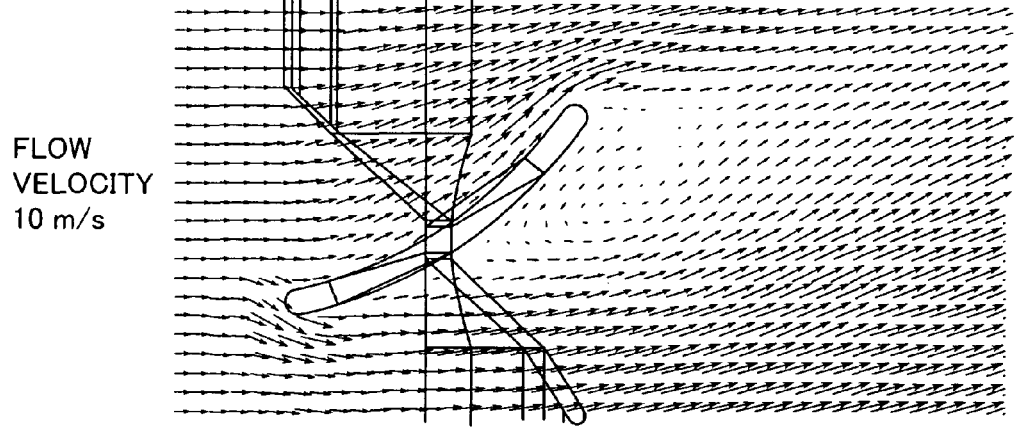

FIG. 16 is a perspective view of a urea water dosing device, which is an eighth embodiment of the fluid mixing apparatus according to the present invention. FIG. 17A is a front view of the urea water dosing device. FIG. 17B is a cross-sectional view of the urea water dosing device cut along the XVIIB-XVIIB line shown in FIG. 17A. As in the case of the seventh embodiment, the urea water dosing device illustrated in the above drawings is used in a urea-SCR system which is used to decompose NOx contained in the exhaust gas of a diesel engine.

The urea water dosing device illustrated in the drawings includes the trunk 40, a flow passage 46, a swirl-generating stator 49, the six openings 16, and the heater 43. The trunk 40 of a cylindrical shape includes a decreased-diameter portion having a diameter decreased to a certain value at an intermediate portion thereof in the longitudinal direction, and the trunk 40 serves as a flow passage for the first fluid. The flow passage 46 is a tube-shaped second fluid flow passage piercing through the wall surface of the decreased-diameter portion of the trunk 40. A closed leading end of the flow passage 46 is arranged concentrically with respect to the trunk 40 along the flow passage axis line of the flow passage for the first fluid to form a double tube at the decreased-diameter portion of the trunk 40. The swirl-generating stator 49 includes six flat-plate vanes radially arranged between the outer circumferential surface of the flow passage 46 and the inner circumferential surface of the decreased-diameter portion of the trunk 40. The six openings 16 are formed on the wall surface of the flow passage 46 at positions in contact with the flow separation areas formed at the respective vanes of the swirl-generating stator 49. The heater 43 heats a portion of the flow passage 46 outside the trunk 40.

End peripheries of the swirl-generating stator 49 at the center side in the radial direction are closely attached to the outer circumferential surface of the flow passage 46. The leading end portion of the flow passage 46 formed with the openings 16 is larger in diameter than the other part of the flow passage 46, and forms a header space which disperses and supplies the second fluid supplied to the flow passage 46 to the six openings 16.

According to the urea-SCR system of the present embodiment, the flow passage 46 is supplied with a two-layer fluid 47 which is a mixture of the urea water and the air, and the urea water contained in the two-layer fluid 47 is evaporated by the heat generated by the heater 43. Further, a fluid 48, which is a mixture of the air, the evaporated gas, and unevaporated urea water, is mixed with the exhaust gas 31 by the urea water dosing device illustrated in the drawings. As the gas mixture 36 generated by the mixing is passed through the SCR catalyst (not illustrated), ammonia reduces NOx to nitrogen gas. Accordingly, NOx contained in the exhaust gas can be reduced.

The effects similar to the effects of the seventh embodiment can be also obtained through the present embodiment. In particular, the present embodiment has an effect of forming the urea-SCR system with a small number of components.

Ninth Embodiment

When the fluid 1 runs into the swirl-generating stator, the range of each of the flow separations areas formed at the downstream surface side of the swirl-generating stator is changed by such factors as the shape of the swirl-generating stator and the angle of attack of each of the vanes. The present inventors conducted a flow analysis through a numeric calculation using a computer, and examined an actual range of the flow separation area.

FIGS. 18A to 18D illustrate a first example of the flow separation area obtained when flat plates are used to form the swirl-generating stator, specifically when each of the flat plates forming the swirl-generating stator is set to have an angle of attack of 30° with respect to the flow. FIG. 18A is a front view illustrating a configuration of the swirl-generating stator. FIG. 18B is a cross-sectional view of the swirl-generating stator cut along the XVIIIB-XVIIIB line shown in FIG. 18A. Similarly to the velocity vector diagram of FIG. 3C, in the diagrams of FIGS. 18C and 18D, among velocity vectors of the fluid around the cross-section cut along the XVIIIC-XVIIIC line, only those velocity vectors near the cross-section are extracted and shown. The size and the direction of each arrow indicate the velocity amplitude and the direction of the flow, respectively. FIGS. 18C and 18D illustrate results obtained when the flow velocity is set to be 1 m/s and 10 m/s, respectively. The following velocity vector diagrams of FIGS. 19C, 19D, 20C, 20D, 21C, 21D, 22C, 22D, 23C, 23D, 24C, 24D, 25C, and 25D, also illustrate results obtained under the same conditions.

In FIG. 18C, a virtual plane perpendicular to the radial direction of one of the radially placed vanes is defined by a coordinate in an axis line direction of the flow passage for the first fluid and a coordinate in a swirl direction perpendicular to the axis line direction. A coordinate of a vane cross-section of the vane located at a most downstream position in the axis line direction and also at a most downstream position in the swirl direction is determined as a point A". Further, a coordinate located at the same position as the point A" in the axis line direction and also located at a most upstream position of the vane cross-section in the swirl direction is determined as a point C. Then, the midpoint of a line segment A"C is determined as a point D. The flow separation area may be considered to include a space which is sandwiched by a line segment representing a downstream surface of the vane cross-section and a line segment symmetrical, with respect to the point D, to a line segment representing an upstream surface of the vane cross-section, and which includes coordinates of the vane in the swirl direction.

Alternatively, the flow separation area may be defined as follows. As indicated by solid lines shown at the downstream side of the flat plate (i.e., at the right side in FIG. 18C), a first straight line extends in a direction perpendicular to the flow passage axis line from a downstream end A of a line segment representing the downstream surface of the flat plate, and a second straight line extends in parallel to the flow passage axis line from an upstream end B of the line segment representing the downstream surface of the flat plate. From the first and second straight lines, their intersection C is obtained. Further, a third straight line extends in parallel to the flow passage axis line from a downstream end A' of a line segment representing the upstream surface of the flat plate. From the third and first straight lines, their intersection A" is obtained. Thereby, the midpoint of the line segment A"C is determined as the point D.

Further, a line symmetrical, with respect to the point D, to the line segment representing the upstream surface of the flat plate is drawn. Then, the intersection between the line and the second straight line and the intersection between the line and the third straight line are determined as points C' and E, respectively. With reference to the size and the direction of the velocity vectors, the flow separation area may be considered to include a region enclosed by a line which sequentially connects the points A', A, B, C', and E (i.e., a region A'ABC'E). Hereinafter, the region A'ABC'E is referred to as a region formed by a first line segment representing the upstream surface of the swirl-generating stator and a second line segment symmetrical with respect to a point to the first line segment.

In FIG. 18D, in which the flow velocity is 10 m/s, the flow separation area may be considered to include the same space as the space described above in FIG. 18C.

FIGS. 19A to 19D illustrate a second example of the flow separation area obtained when flat plates are used to form the swirl-generating stator, specifically when each of the flat plates forming the swirl-generating stator is set to have an angle of attack of 60° with respect to the flow. In this case, too, the flow separation area may be considered to include the space obtained in accordance with a procedure similar to the procedure described in the FIG. 18C.

FIGS. 20A to 20D illustrate a third example of the flow separation area obtained when flat plates are used to form the swirl-generating stator, specifically when each of the flat plates forming the swirl-generating stator is set to have an angle of attack of 15° with respect to the flow. In this case, too, with reference to the size and the direction of the velocity vectors, the flow separation area may be considered to include the region formed by the first line segment representing the upstream surface of the swirl-generating stator and the second line segment symmetrical with respect to a point to the first line segment.

FIGS. 21A to 21D illustrate a fourth example of the flow separation area obtained when flat plates are used to form the swirl-generating stator, specifically when each of the flat plates forming the swirl-generating stator is set to have an angle of attack of 15° with respect to the flow. The flat plates used in the present example are thicker than the flat plates used in the example shown in FIGS. 20A to 20D. As indicated by solid lines shown in FIG. 21C, in this case, too, with reference to the size and the direction of the velocity vectors, the flow separation area may be considered to include the region formed by the first line segment representing the upstream surface of the swirl-generating stator and the second line segment symmetrical with respect to a point to the first line segment.

FIGS. 22A to 22D illustrate a first example of the flow separation area obtained when curved plates convexed toward the upstream side are used to form the swirl-generating stator. As indicated by solid lines shown in FIG. 22C, in this case, too, with reference to the size and the direction of the velocity vectors, the flow separation area may be considered to include the region formed by the first line segment representing the upstream surface of the swirl-generating stator and the second line segment symmetrical with respect to a point to the first line segment.

FIGS. 23A to 23D illustrate a second example of the flow separation area obtained when curved plates convexed toward the upstream side are used to form the swirl-generating stator. Each of the curved plates of the present example is larger in the curvature and the angle of attack than the curved plates shown in FIGS. 22A to 22D. As indicated by solid lines shown in FIG. 23C, in this case, too, with reference to the size and the direction of the velocity vectors, the flow separation area may be considered to include the region formed by the first line segment representing the upstream surface of the swirl-generating stator and the second line segment symmetrical with respect to a point to the first line segment.

FIGS. 24A to 24D illustrate a first example of the flow separation area obtained when curved plates convexed toward the downstream side are used to form the swirl-generating stator. As indicated by solid lines shown in FIG. 24C, in this case, too, with reference to the size and the direction of the velocity vectors, the flow separation area may be considered to include the region formed by the first line segment representing the upstream surface of the swirl-generating stator and the second line segment symmetrical with respect to a point to the first line segment.

FIGS. 25A to 25D illustrate a second example of the flow separation area obtained when curved plates convexed toward the downstream side are used to form the swirl-generating stator. In the present example, an upstream edge and a downstream edge of each of the curved plates are rounded. Further, in the present example, each of the curved plates is larger in the curvature and smaller in the angle of attack than the curved plates shown in FIGS. 24A to 24D. As indicated by solid lines shown in FIG. 25C, in this case, too, with reference to the size and the direction of the velocity vectors, the flow separation area may be considered to include the region formed by the first line segment representing the upstream surface of the swirl-generating stator and the second line segment symmetrical with respect to a point to the first line segment.

As illustrated in FIGS. 18A to 25D, from the calculation results obtained in the respective cases in which the swirl-generating stator uses the flat plates of different angles of attack, the curved plates convexed toward the downstream side, and the curved plates convexed toward the upstream side, the flow separation area may be considered to include the region formed by the first line segment representing the upstream surface of the swirl-generating stator and the second line segment symmetrical with respect to a point to the first line segment.

That is, the virtual plane perpendicular to the radial direction of one of the radially placed vanes is defined by the coordinate in the axis line direction of the flow passage for the first fluid and the coordinate in the swirl direction perpendicular to the axis line direction. Then, the coordinate of the vane cross-section of the vane located at the most downstream position in the axis line direction and also at the most downstream position in the swirl direction is determined as the point A''. Further, the coordinate located at the same position as the point A'' in the axis line direction and also located at the most upstream position of the vane cross-section in the swirl direction is determined as the point C. Then, the midpoint of the line segment A''C is determined as the point D. With reference to the size and the direction of the velocity vectors, the flow separation area in the present invention may be considered to include the space which is sandwiched by the line segment representing the downstream surface of the vane cross-section and the line segment symmetrical, with respect to the point D, to the line segment representing the upstream surface of the vane cross-section, and which includes the coordinates of the vane in the swirl direction. If the thickness of each of the vanes forming the swirl-generating stator is small with respect to the width of the vane, the flow separation area may be considered to include a quadrangle ABC'E.

The fluid mixing apparatus according to the present invention can be used in, for example, a urea water dosing device for reducing NOx contained in an engine exhaust gas, an EGR device for suctioning the engine exhaust gas into the intake air to mix them, a combustor for performing combustion by mixing a gas fuel into the air, a reformer for reducing carbon monoxide, which is generated when hydrocarbon gas is reformed to produce hydrogen in a fuel battery, by mixing air into carbon monoxide and oxidizing carbon monoxide. In general, in a chemical reaction involving a plurality of gases, making the density of the plurality of gases even is effective in obtaining an expected reaction. The present invention, which is the apparatus for mixing gases while passing the gases therethrough, and which contributes to promotion of the mixing of fluids and to downsizing of the apparatus, can be used in a variety of chemical reaction processes.

What is claimed is:

1. A fluid mixing apparatus for mixing a first fluid and a second fluid while passing the two fluids therethrough, the fluid mixing apparatus comprising:

a flow passage for passing the first fluid therethrough;

a swirl-generating stator including a plurality of vanes radially placed around a central axis in the flow passage for the first fluid such that a longitudinal axis of each of the plurality of vanes is transverse to the first fluid flow and a radially outer end of at least one of the plurality of vanes is fixed to a wall of the flow passage for the first fluid, the wall being a surface of the flow passage aligned essentially parallel to the central axis of the flow passage, the swirl-generating stator being arranged to cause the passing first fluid as a whole to swirl in a circumferential direction around the central axis of the flow passage for the first fluid;

a plurality of openings formed on the wall of the flow passage for the first fluid, the plurality of openings being positioned at flow delamination areas of the first fluid formed along downstream surfaces of the swirl-generating stator when the first fluid passes through the swirl-generating stator; and a second fluid supplying means for supplying the second fluid to the flow delamination areas of the first fluid through the plurality of openings, wherein a virtual plane perpendicular to a radial direction of one of the radially placed vanes includes a first point, the first point being defined where a line defined by an upstream surface of the vane intersects a line perpendicular to the central axis direction which includes a point at the most downstream position in the central axis direction of a downstream surface of the vane,
a second point located a most upstream position in the central axis direction of the upstream surface of the vane,
a third point, the third point being defined where a line in the central axis direction from the second point intersects a line in a swirl direction perpendicular to the central axis direction from the first point, and
a fourth point, the fourth point being defined by where a line in the central axis direction from the first point intersects a line from the third point in a direction parallel to the line defined by the upstream surface of the vane, and
wherein the flow delamination area is the area defined by the first, second third and fourth points, the point at the most downstream position in the central axis direction of the downstream surface of the vane, and the downstream surface of the vane.

2. The fluid mixing apparatus according to claim 1, wherein the second fluid supplying means includes:
a header space formed on an outer circumferential surface side of an outer wall of the flow passage for the first fluid on which the plurality of openings are formed; and
a duct for supplying the second fluid to the header space.

3. The fluid mixing apparatus according to claim 1, wherein the second fluid supplying means includes:
a second fluid flow passage placed along the central axis line of the flow passage for the first fluid, and formed on an inner circumferential surface side of an inner wall of the flow passage for the first fluid on which the plurality of openings are formed, and
a duct piercing through an outer wall of the flow passage for the first fluid, and connected to the second fluid flow passage for supplying thereto the second fluid.

4. The fluid mixing apparatus according to claim 1, wherein a cross-sectional area of the flow passage for the first fluid is smaller at a position at which the swirl-generating stator is provided than at an upstream position thereof.

5. The fluid mixing apparatus according to claim 1, further comprising a plurality of the flow passages for the first fluid each including therein the swirl-generating stator,
wherein the plurality of flow passages are juxtaposed inside another flow passage which is larger in cross-section than the plurality of flow passages, with axis lines of the plurality of flow passages extending in parallel to an axis line of the another flow passage.

* * * * *